United States Patent
Li et al.

(10) Patent No.: US 11,822,183 B2
(45) Date of Patent: Nov. 21, 2023

(54) DISPLAY APPARATUS

(71) Applicant: Hisense Visual Technology Co., Ltd., Shandong (CN)

(72) Inventors: Fulin Li, Shandong (CN); Mingsheng Qiao, Shandong (CN); Nannan Zhang, Shandong (CN); Jinlong Li, Shandong (CN); Weidong Liu, Shandong (CN); Yushuai Zhai, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/656,965

(22) Filed: Mar. 29, 2022

(65) Prior Publication Data

US 2022/0221758 A1 Jul. 14, 2022

Related U.S. Application Data

(63) Continuation of application No. PCT/CN2021/081640, filed on Mar. 18, 2021.

(30) Foreign Application Priority Data

Mar. 25, 2020 (CN) .......................... 202010221021.1
Apr. 28, 2020 (CN) .......................... 202010351591.2

(Continued)

(51) Int. Cl.
*G02F 1/00* (2006.01)
*G02F 1/13357* (2006.01)

(52) U.S. Cl.
CPC .. *G02F 1/133603* (2013.01); *G02F 1/133605* (2013.01); *G02F 1/133606* (2013.01)

(58) Field of Classification Search
CPC ......... G02F 1/133603; G02F 1/133605; G02F 1/133606
See application file for complete search history.

(56) References Cited

U.S. PATENT DOCUMENTS

2005/0045897 A1 3/2005 Chou et al.
2007/0115671 A1* 5/2007 Roberts ..................... G09F 9/35
362/367

(Continued)

FOREIGN PATENT DOCUMENTS

CN 1807969 A 7/2006
CN 101000427 A 7/2007

(Continued)

OTHER PUBLICATIONS

International Search Report, dated Jul. 1, 2021, from PCT/CN2021/081640, filed Mar. 18, 2021.

(Continued)

*Primary Examiner* — Gerald J Sufleta, II
(74) *Attorney, Agent, or Firm* — Workman Nydegger

(57) ABSTRACT

A display apparatus, comprising: a plurality of light sources arranged into an array, angle selection sheets on the light emitting sides of the light sources, and reflective layers on the sides of the light sources away from the angle selection sheets. The angle selection sheets are used for reflecting light rays of a first incident angle range and transmitting light rays of a second incident angle range, wherein an incident angle value corresponding to the first incident angle range is smaller than an incident angle value corresponding to the second incident angle range. The reflective layers can conduct diffuse reflection on the light rays reflected by the angle selection sheets and the light rays re-enter the angle selection sheets, so that light rays of a second incident angle subjected to the diffuse reflection are transmitted while light rays of a first incident angle repeat the described reflection operation.

9 Claims, 14 Drawing Sheets

(30) Foreign Application Priority Data

| Apr. 28, 2020 | (CN) | 202020687645.8 |
|---|---|---|
| May 26, 2020 | (CN) | 202010453658.3 |
| Jun. 10, 2020 | (CN) | 202010522067.7 |
| Jun. 10, 2020 | (CN) | 202010522571.7 |
| Jun. 19, 2020 | (CN) | 202010570713.7 |
| Jul. 31, 2020 | (CN) | 202010756556.9 |
| Aug. 7, 2020 | (CN) | 202010791424.X |
| Aug. 7, 2020 | (CN) | 202010791451.7 |
| Aug. 24, 2020 | (CN) | 202010855892.9 |
| Oct. 29, 2020 | (CN) | 202011182703.2 |
| Nov. 30, 2020 | (CN) | 202022825588.8 |
| Dec. 18, 2020 | (CN) | 202011508504.6 |

(56) References Cited

U.S. PATENT DOCUMENTS

| 2008/0225512 | A1* | 9/2008 | Roberts | G02F 1/133605 |
| | | | | 362/297 |
| 2013/0010230 | A1 | 1/2013 | Matsuki et al. | |
| 2015/0003044 | A1* | 1/2015 | Pelka | G02F 1/133603 |
| | | | | 362/97.1 |
| 2017/0322361 | A1 | 11/2017 | Park et al. | |
| 2018/0259166 | A1 | 9/2018 | Min | |
| 2018/0374828 | A1 | 12/2018 | Liao et al. | |
| 2020/0033979 | A1* | 1/2020 | Sauer | G06F 3/0418 |
| 2020/0386922 | A1* | 12/2020 | Han | G02B 5/26 |

FOREIGN PATENT DOCUMENTS

| CN | 101281321 A | 10/2008 |
|---|---|---|
| CN | 101416323 A | 4/2009 |
| CN | 101440925 A | 5/2009 |
| CN | 101529323 A | 9/2009 |
| CN | 101666943 A | 3/2010 |
| CN | 101713888 A | 5/2010 |
| CN | 101782203 A | 7/2010 |
| CN | 102478178 A | 5/2012 |
| CN | 102478187 A | 5/2012 |
| CN | 102650383 A | 8/2012 |
| CN | 102694106 A | 9/2012 |
| CN | 102884365 A | 1/2013 |
| CN | 203431608 U | 2/2014 |
| CN | 104285196 A | 1/2015 |
| CN | 106782128 A | 5/2017 |
| CN | 206555836 U | 10/2017 |
| CN | 108107630 A | 6/2018 |
| CN | 108303822 A | 7/2018 |
| CN | 207743251 U | 8/2018 |
| CN | 108490685 A | 9/2018 |
| CN | 108549178 A | 9/2018 |
| CN | 208014703 U | 10/2018 |
| CN | 108828841 A | 11/2018 |
| CN | 109557721 A | 4/2019 |
| CN | 109638120 A | 4/2019 |
| CN | 109920902 A | 6/2019 |
| CN | 110398857 A | 11/2019 |
| CN | 110456574 A | 11/2019 |
| CN | 110543049 A | 12/2019 |
| CN | 110824766 A | 2/2020 |
| CN | 110908181 A | 3/2020 |
| CN | 110928038 A | 3/2020 |
| CN | 210294751 U | 4/2020 |
| CN | 210723020 U | 6/2020 |
| CN | 210835515 U | 6/2020 |
| CN | 111399280 A | 7/2020 |
| CN | 210982988 U | 7/2020 |
| CN | 210982989 U | 7/2020 |
| CN | 210982990 U | 7/2020 |
| CN | 211826819 U | 10/2020 |
| CN | 211979375 U | 11/2020 |
| CN | 112882282 A | 6/2021 |
| CN | 113126363 A | 7/2021 |
| CN | 113270437 A | 8/2021 |
| CN | 113777826 A | 12/2021 |
| EP | 0735952 A1 | 10/1996 |
| JP | 05-235413 A | 9/1993 |
| JP | 2010272418 A | 12/2010 |
| JP | 2011-233395 A | 11/2011 |
| JP | 2011243563 A | 12/2011 |
| JP | 2013-143273 A | 7/2013 |
| JP | 2018106971 A | 7/2018 |
| JP | 2018207048 A | 12/2018 |
| KR | 10-2007-0002144 A | 1/2007 |
| TW | I255896 B | 6/2006 |
| WO | 2013064369 A1 | 5/2013 |

OTHER PUBLICATIONS

International Search Report and Written Opinion received for PCT Patent Application No. PCT/CN2021/081640, dated Jul. 1, 2021, 14 pages (3 pages of English Translation and 11 pages of Original Document).

Chinese Office Action, dated Jun. 22, 2022, from Chinese patent application No. 202010756556.9.

Chinese Office Action, dated Oct. 19, 2022, from Chinese patent application No. 202010756556.9.

Chinese Office Action, dated Aug. 5, 2022, from Chinese patent application No. 202010791424.X.

Chinese Office Action, dated Jun. 17, 2022, from Chinese patent application No. 202010791451.7.

Chinese Office Action, dated Jul. 14, 2022, from Chinese patent application No. 202010855892.9.

Chinese Office Action, dated Sep. 29, 2022, from Chinese patent application No. 202010855892.9.

Chinese Office Action, dated Oct. 27, 2022, from Chinese patent application No. 202011182703.2.

* cited by examiner

-- Related Art --

DISPLAY APPARATUS

CROSS REFERENCE TO RELATED APPLICATIONS

This application is a continuation application of PCT/CN2021/081640, filed on Mar. 18, 2021, which claims priorities to Chinese patent applications No. 202010221021.1 filed on Mar. 25, 2020, No. 202010351591.2 filed on Apr. 28, 2020, No. 202020687645.8 filed on Apr. 28, 2020, No. 202010453658.3 filed on May 26, 2020, No. 202010522067.7 filed on Jun. 10, 2020, No. 202010522571.7 filed on Jun. 10, 2020, No. 202010570713.7 filed on Jun. 19, 2020, No. 202010756556.9 filed on Jul. 31, 2020, No. 202010855892.9 filed on Aug. 24, 2020, No. 202010791424.X filed on Aug. 7, 2020, No. 202010791451.7 filed on Aug. 7, 2020, No. 202011182703.2 filed on Oct. 29, 2020, No. 202022825588.8 filed on Nov. 30, 2020, and No. 202011508504.6 filed on Dec. 18, 2020, the entire contents of which are incorporated herein by reference.

FIELD

The present application relates to the display technology, in particular to a display apparatus.

BACKGROUND

As the mainstream panel at present, a liquid crystal panel has the advantages of low power consumption, small size, low radiation and the like. A liquid crystal panel is not self-lit panel, and needs to work with a backlight module together. At present, the backlight module can be divided into a direct backlight module and an edge lit backlight module. The direct backlight module is widely used because of its advantages of high brightness, efficient light utilization, simple structure and the like. An existing direct backlight module usually uses a light emitting diode (LED) as a backlight source, which has the advantages that backlight brightness is high and will not decrease after long-term use. Light emitting from the LED is distributed like a Lambert body, and emitted light rays has high intensity at a small angle and low intensity at a large angle, resulting in uneven light distribution. In order to meet the requirements of production cost and ultra-thin appearance, how to realize the uniformity of backlight to meet the requirements of image quality is an urgent issue.

SUMMARY

A display apparatus according to an present application includes: a display panel, configured to display an image; a micro light emitting diode light board, used as a backlight source; wherein the panel is on a light emitting side of the micro light emitting diode light board; the micro light emitting diode light board includes a circuit board, micro light emitting diodes and a reflective layer; the circuit board is configured to provide a driving signal; the micro light emitting diodes is on the circuit board; and the reflective layer is on a surface of a side of the circuit board close to the micro light emitting diodes, the reflective layer includes an opening for one of exposing the micro light emitting diode, and the reflective layer is configured to perform diffuse reflection on incident light rays; an angle selection layer on the light emitting side of the micro light emitting diode light board, configured to reflect light rays with a first incident angle range and transmit light rays with a second incident angle range; wherein an incident angle value corresponding to the first incident angle range is smaller than an incident angle value corresponding to the second incident angle range; and the reflective layer and the angle selection layer are configured for improving light emitting uniformity of the micro light emitting diode light board; and a diffusion layer on a side of the angle selection layer away from the micro light emitting diode light board, or, between the angle selection layer and the micro light emitting diode light board.

In some embodiments, a vertical distance from the circuit board to the diffusion layer and a distance between every two adjacent micro light emitting diodes meet a following relationship: $0.15 \leq h/p < 0.67$; wherein h represents the vertical distance from the circuit board to the diffusion layer, and p represents the distance between every two adjacent micro light emitting diodes.

In some embodiments, the angle selection layer further includes: a plurality of film layers, disposed in a laminated mode, wherein every two adjacent film layers of the plurality of film layers have different refraction indexes; wherein the refraction indexes and thicknesses of the plurality of film layers meet a condition of reflecting the light rays with the first incident angle range and transmitting the light rays with the second incident angle range.

In some embodiments, the first incident angle range is 0° to 70°, and the second incident angle range is greater than 70°.

In some embodiments, a reflectivity of the angle selection layer to the light rays with the first incident angle range is decreased with increasing of an incident angle; and the reflectivity of the angle selection layer to the light rays with the first incident angle range is 10% to 80%, and the reflectivity of the angle selection layer to the light rays with the second incident angle range is less than 10%.

In some embodiments, the micro light emitting diode light board further includes: a packaging layer on a surface of a side of the micro light emitting diode away from the circuit board.

In some embodiments, wherein the angle selection layer is attached to a surface of the diffusion layer.

In some embodiments, the display apparatus further includes a transparent substrate between the micro light emitting diode light board and the diffusion layer; wherein the angle selection layer is attached to a surface of a side of the transparent substrate away from the micro light emitting diode light board.

In some embodiments of the present application, the display apparatus further includes a transparent support on the micro light emitting diode light board, configured to support the diffusion layer.

In some embodiments of the present application, the display apparatus further includes a base, wherein the film layers disposed in the laminated mode are disposed on the base.

DETAILED DESCRIPTION OF THE EMBODIMENTS

In order to make the objectives, features and advantages of the present application obvious and easy to understand, the present application will be further described below in combination with the accompanying drawings and embodiments. However, example implementations can be implemented in a variety of forms and should not be construed as limited to the implementations set forth herein.

A liquid crystal display apparatus is mainly includes a backlight module and a liquid crystal panel. The liquid crystal panel does not emit light itself, and needs to use a light source according to a backlight module to achieve brightness display.

The work principle of the liquid crystal display apparatus is that liquid crystals are placed between two pieces of conductive glass, the electric field effect which is driven by an electric field between two electrodes causes distortion of liquid crystal molecules, so as to control transmission or shielding for light emitting from a backlight source, thereby displaying images. If color light filters are added, color images may be displayed.

Figure 1:
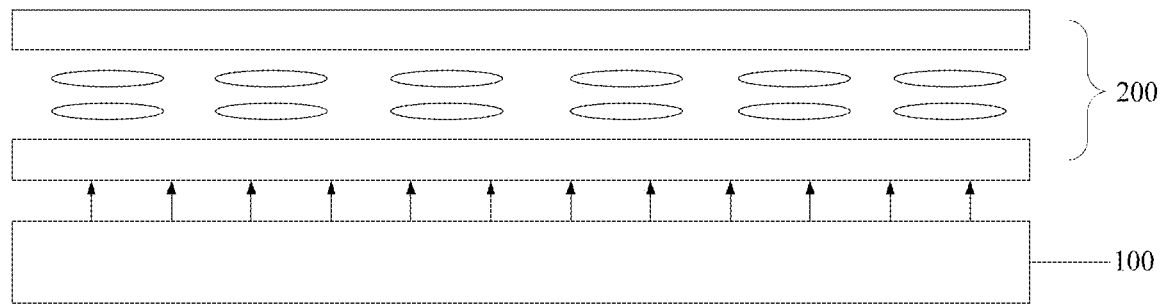
FIG. 1 is a schematic cross-sectional view of a display apparatus according to an embodiment of the present application.

FIG. 1 is a schematic cross-sectional view of a display apparatus according to an embodiment of the present application.

Referring to FIG. 1, the display apparatus includes: a backlight module 100 and a panel 200. The backlight module 100 is configured to provide a backlight source for the panel 200, and the panel 200 is configured to display images.

The backlight module 100 is usually at the bottom of the display apparatus, with its shape and size being adaptive to those of the display apparatus. When applied to devices such as a television or a mobile terminal, the backlight module is usually in a rectangular shape.

The backlight module in the embodiments of the present application adopts a direct backlight module which is configured to uniformly emit light rays on a whole light emitting surface to provide light rays full in brightness and uniform in distribution for the panel, so that the panel can normally display images.

The panel 200 is located on a light emitting side of the backlight module 100, and a shape and size of the panel are usually matched with those of the backlight module. Usually, the panel 200 may be rectangular, including a top side, a bottom side, a left side and a right side. The top side and the bottom side are opposite, the left side and the right side are opposite, the top side is connected with one end of the left side and one end of the right side, and the bottom side is connected with the other end of the left side and the other end of the right side.

The panel 200 is a panel which is able to transmit light and adjust transmittance of light, but the panel does not emit light itself. The panel 200 has a plurality of pixel units arranged in an array, and each pixel unit may independently control a transmittance of and color of light entering into the pixel unit from the backlight module 100 to make light rays transmitted through all the pixel units form a display image.

The structure of the direct type backlight module is described below. In view of backlight uniformity issue, the present application provides a structure of a backlight module.

Figure 2:
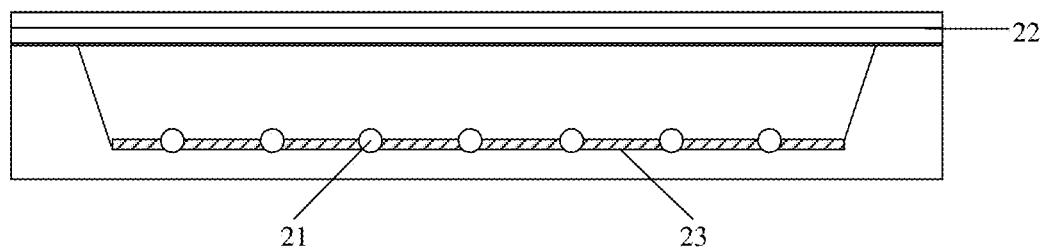
FIG. 2 is a first schematic structural diagram of a backlight module according to an embodiment of the present application.

As shown in FIG. 2, the backlight module according to the embodiment of the present application includes: a plurality of light sources 21 arranged in an array, an angle selection layer 22 and a reflective layer 23. In some embodiments, the light sources 21 are ordinary LED lamp beads, a single LED lamp bead is a light emitting device with an LED chip encapsulated, and the plurality of LED lamp beads are arranged on a circuit board. Usually, the circuit board is in a strip shape and in the form of an LED light bar. In order to expand a light spot range of LEDs, matching the LEDs with lens is also usually adopted to increase the brightness of large-angle emitting light from the LEDs. In some embodiments, the light sources 21 may be micro light emitting diodes or sub-millimeter light emitting diodes, also known as mini-LEDs. The light source of that type will be illustrated in detail in subsequent embodiments.

An angle selection layer 22 is located on a light emitting side of the light sources 21. The angle selection layer 22 is configured to reflect light rays with a first incident angle range and transmit light rays with a second incident angle range. An incident angle value corresponding to the first incident angle range is smaller than an incident angle value corresponding to the second incident angle range. That is, the angle selection layer is configured that: the larger an angle of incident light rays, the smaller a reflectivity to the incident light rays; and the larger the angle of the incident light rays, the larger a transmittance to the incident light rays.

The reflective layer 23 is located on a side of the light sources 21 away from the angle selection layer 22, and configured to do scattering or diffuse reflection on the light rays reflected from the angle selection layer to emit the light rays to the panel. In some embodiments, the reflective layer 23 is a reflective sheet. The reflective sheet is located on the circuit board and has holes for exposing the light sources 21. It is noted that the reflective layer 23 is not limited to the sheet-like reflective sheet, and also refer to structure arrangements with a reflecting effect, such as a surface of the circuit board having a reflecting function.

In the embodiment of the present application, by disposing the angle selection layer 22 on the light emitting side of the light sources 21, the angle selection layer 22 may enhance reflection for light rays at a particular angle(s) within the light rays with the first incident angle range, meanwhile, and enhance transmission for the light rays at a particular angle(s) within the light rays with the second incident angle range. The first incident angle range corresponds to emitting angles with high light intensity and the second incident angle range corresponds to emitting angles with low light intensity, light rays with small emitting angles may be transmitted only partially, a part of the light rays at the particular angle are reflected to the direction of the light sources, and light rays with large emitting angles are emitted in an transmittance-enhancing mode; and the light rays with the small angles reflected to the direction of the light sources are subjected to scattering or diffuse reflection by the reflective layer 23 to form light rays with large emitting angles so as to be emitted from the angle selection layer in an transmittance-enhancing mode, so that emitting intensity of the small-angle light rays is reduced, emitting intensity of the large-angle light rays is increased, final emitting illuminance is made uniform, and the uniformity of light emitted from the light sources is improved.

The angle selection layer is configured that: the larger the angle of the incident light rays, the smaller the reflectivity to the incident light rays; and the larger the angle of the incident light rays, the larger the transmittance to the incident light rays. Characteristics of the angle selection layer decrease the emitting intensity of the small-angle light rays and increase the emitting intensity of the large-angle light rays. A specific principle and structure of the angle selection layer will be illustrated in detail in subsequent embodiments.

According to light intensity distribution of the light sources, generally, the emitting light intensity at an area close to an emitting center is high, and the light intensity at an edge area away from the emitting center is low, and therefore when the light sources emit to a certain plane, brightness corresponding to the area of the emitting center is high, while brightness corresponding to the area away from the emitting center is low, so that light intensity distribution at a junction between two adjacent light sources in the backlight module is weak, resulting in poor uniformity, that is, emitting surface illuminance is inconsistent. The display apparatus according to the embodiments of the present application can make emitting surface illuminance of the light sources consistent, decrease light intensity close to the emitting center of the light sources and increase light intensity at edges.

Figure 3A:
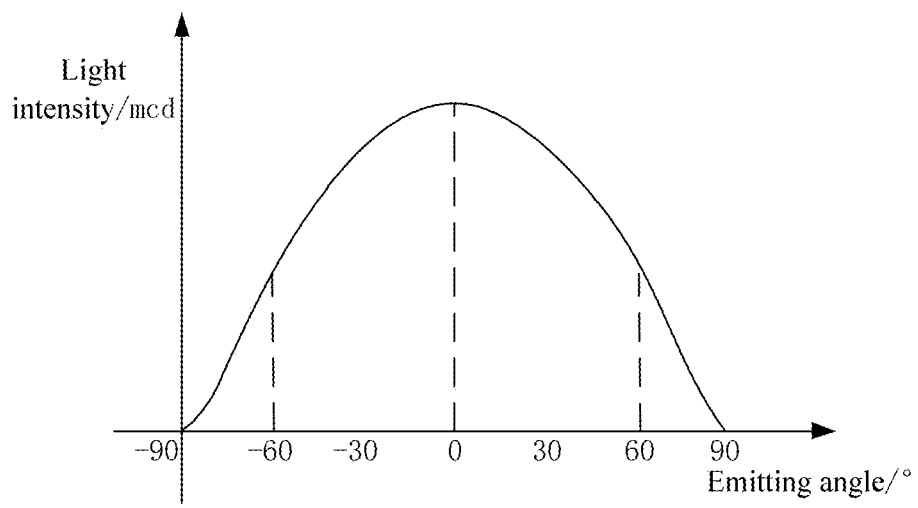
FIG. 3A is an emergent light intensity distribution diagram of a backlight module without an angle selection layer.
Figure 3B:
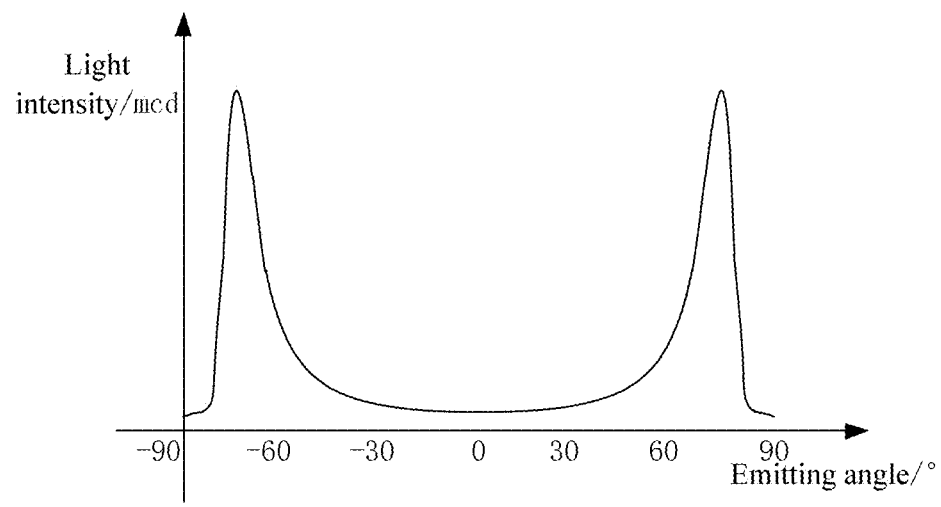
FIG. 3B is an emergent light intensity distribution diagram of a backlight module with an angle selection layer.

FIG. 3A and FIG. 3B show a comparison of light intensity distribution of a single light source of the backlight module without the angle selection layer 22 and a single light source with light passing the angle selection layer. According to the schematic diagram of light intensity distribution of the light source without the angle selection layer as shown in FIG. 3A, emitting light intensity of the light rays of the light source close to the emitting center (close to 0°) is far greater than light intensity of the light rays of the light source away from the emitting center (approaching 90°), and thus fewer light rays are distributed at a junction region of the light sources, and light uniformity is poor. After the angle selection layer 22 is disposed in the backlight module, light intensity distribution of light rays passing the angle selection layer is as shown in FIG. 3B. Original small-angle emitting light rays are reflected by the angle selection layer, after a scattering or diffuse reflection effect of the reflective layer, a part of light rays are transmitted at a large angle, and thus emitting light intensity at the edge areas is increased, and light intensity at the center area is decreased, so that final emitting illuminance of the light sources is substantially equal at all areas, and uniformity of the light rays emitted from the light sources is improved.

A specific arrangement for the angle selection layer 22 in the backlight module is specifically described below.

Figure 4:
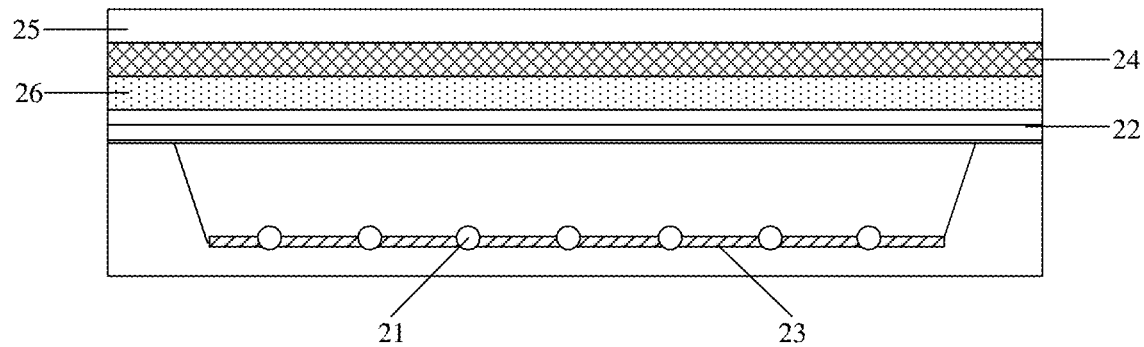
FIG. 4 is a schematic structural diagram of a backlight module according to some embodiments of the present application.
Figure 5:
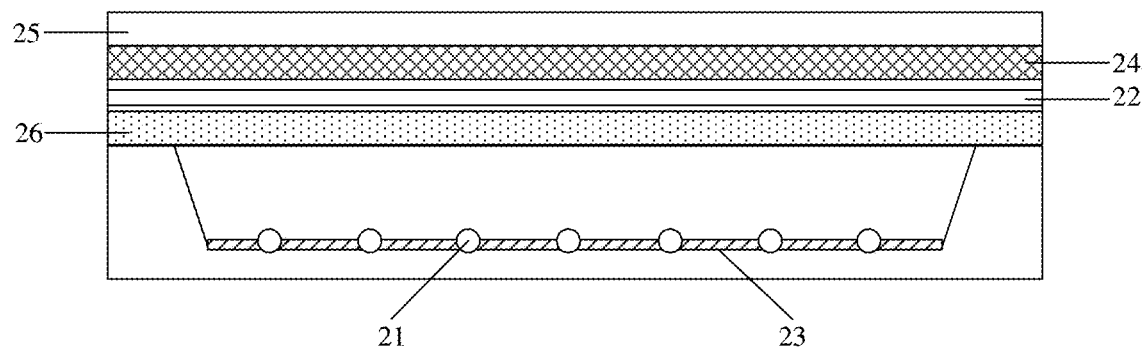
FIG. 5 is a schematic structural diagram of a backlight module according to some embodiments of the present application.

As shown in FIG. 4 and FIG. 5, the backlight module according to the embodiment of the present application further includes a diffusion layer 26.

The diffusion layer 26 is located on a side of the light sources 21 away from the reflective layer 23, namely located on the light emitting side of the light sources 21, and the diffusion layer 26 is configured for uniformizing light.

As shown in FIG. 4, the angle selection layer 22 is located on a side of the diffusion layer 26 close to the light sources 21, and specifically, the angle selection layer 22 may be located between the diffusion layer 26 and the light sources 21.

As shown in FIG. 5, the angle selection layer 22 is located on a side of the diffusion layer 26 away from the light sources 21, and specifically, the diffusion layer 26 carries the angle selection layer 22. The arrangement may guarantee that the angle selection layer 22 has an enough distance to reflect the small-angle light rays.

When the backlight module according to the embodiment of the present application is applied to a small-size display apparatus, the structure as shown in FIG. 4 or FIG. 5 may be adopted. When the backlight module is applied to a large-size display apparatus, since a back frame of the backlight module cannot play a complete supporting role for the angle selection layer 22 and the diffusion layer 26 thereon, as shown in FIG. 6 and FIG. 7, a glass substrate 27 may be further disposed in the backlight module to support all functional films or sheets in the backlight module.

Figure 6:
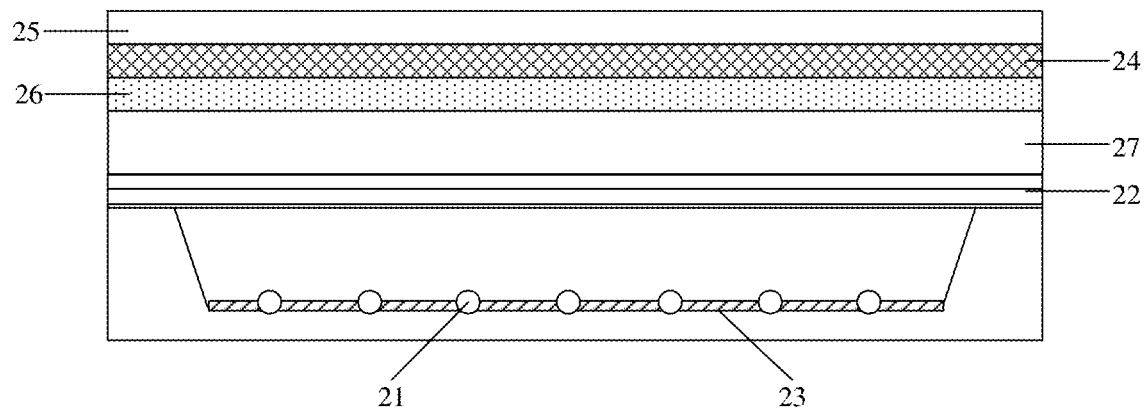
FIG. 6 is a schematic structural diagram of a backlight module according to some embodiments of the present application.
Figure 7:
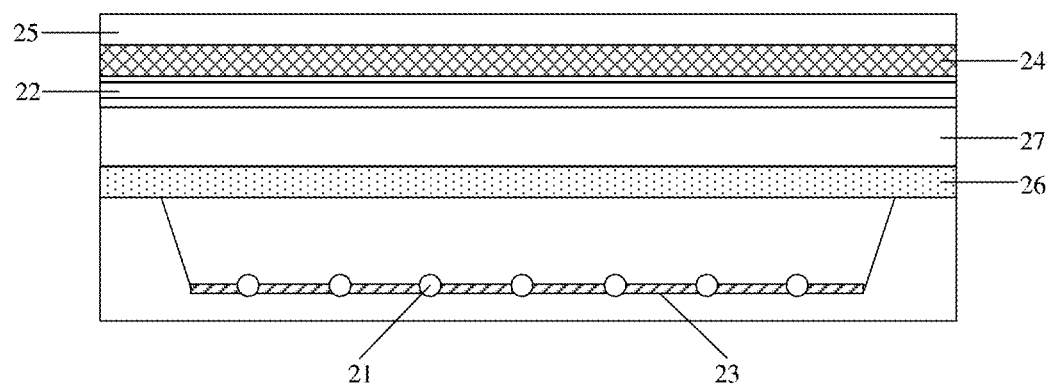
FIG. 7 is a schematic structural diagram of a backlight module according to some embodiments of the present application.

Specifically, as shown in FIG. 6, the glass substrate 27 is located on the light emitting side of the light sources 21, the angle selection layer 22 may be located on a surface of a side of the glass substrate 27 facing the light sources 21, and the diffusion layer 26 may be located on a surface of a side of the glass substrate 27 away from the light sources 21; or, as shown in FIG. 7, the diffusion layer 26 may be located on the surface of the side of the glass substrate 27 facing the light sources 21, and the angle selection layer 22 may be located on the surface of the side of the glass substrate 27 away from the light sources 21. When the glass substrate is disposed in the backlight module, a layer of diffusion material may be formed on a surface of a side of the glass substrate to form a diffusion plate of an integrated structure, and the diffusion plate may replace a diffusion plate made of resin base materials such as PC in related art.

In another embodiment, the surface of the side of the glass substrate 27 facing the light sources 21 may also be sanded to form a sanded surface, which may replace the effect of the diffusion layer shown in FIG. 7, so that a manufacturing process is simplified.

According to the backlight module according to the embodiment of the present application, the glass substrate is used as a base material for the diffusion material, compared with that a resin material is used as the base material for the diffusion material, since the glass substrate has high rigidity, a thickness may be 1.5 mm and even smaller. Besides, the glass substrate has a smaller expansion coefficient, so that there is no need of reserving a large expansion space for the glass substrate when the backlight module is designed, and ultra-narrow bezel design may be achieved. In related art, base materials (usually PET base materials) need to be disposed on two sides of a quantum dot layer when the quantum dot layer is manufactured, while in the embodiments of the present application, a quantum dot layer 24 may be directly manufactured on the surface of the angle selection layer 22 or the diffusion layer 26, only a protective layer needs to be disposed on one side, and thus the thickness of the backlight module may be further reduced.

Figure 8:
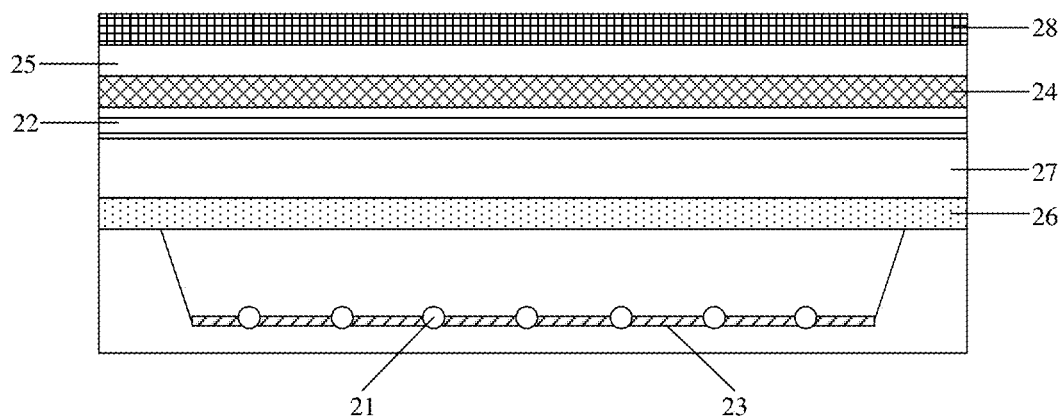
FIG. 8 is a schematic structural diagram of a backlight module according to some embodiments of the present application.

Further, as shown in FIG. 8, the backlight module according to the embodiment of the present application further includes: an optical film 28 located on a side of the protective layer 25 away from the quantum dot layer 24. During implementation, the optical film 28 may include a brightness enhancement film which is configured to enhance the brightness of the light rays emitted from the front face of the backlight module to improve light ray using efficiency. In addition, the optical film may further include a diffusion sheet which is configured to diffuse the light rays a second time; or, when the backlight module is used together with the liquid crystal panel, the optical film may further include a polarizer located on the outermost side, which is not limited herein.

Next, description is made in detail by taking that the light sources 21 are the micro light emitting diodes or sub-millimeter light emitting diodes (also known as mini-LED) as an example.

Figure 9:
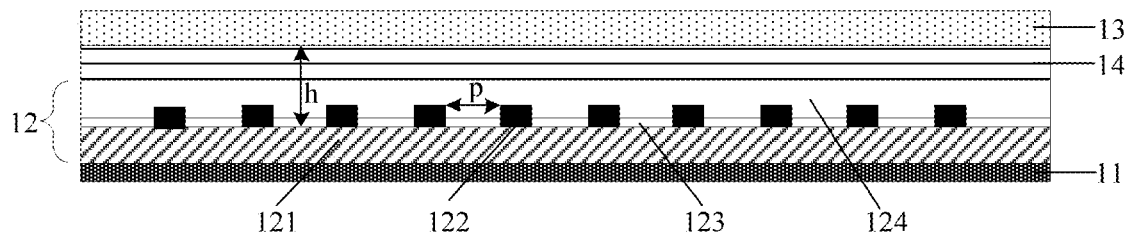
FIG. 9 is a first schematic cross-sectional view of a backlight module according to an embodiment of the present application.

FIG. 9 is a schematic cross-sectional view of the backlight module according to an embodiment of the present application.

Referring to FIG. 9, in a light emitting direction of the light rays in the backlight module, the backlight module includes: a back plate 11, a micro light emitting diode light board 12 and a diffusion layer 13.

The back plate 11 is located at the bottom of the backlight module and configured to support. Usually, the back plate 11 is of a square structure, and when the back plate is applied to a special-shaped display apparatus, a shape of the back plate is adaptive to a shape of the display apparatus. The back plate 11 includes a top side, a bottom side, a left side and a right side. The top side and the bottom side are opposite, the left side and the right side are opposite, the top side is connected with one end of the left side and one end of the right side, and the bottom side is connected with the other end of the left side and the other end of the right side.

In the embodiment of the present application, the backlight module is a direct type backlight module, and the micro light emitting diode light board 12 is located on the back plate 11. Usually, the whole micro light emitting diode light board 12 may be square or rectangular, with a length of 200 mm to 800 mm and a width of 100 mm to 500 mm.

A plurality of micro light emitting diode light boards 12 may be disposed according to a size of the display apparatus, and the micro light emitting diode light boards 12 are spliced to collectively provide backlight. In order to avoid optical problems caused by splicing of the micro light emitting diode light boards 12, splicing seams between the adjacent micro light emitting diode light boards 12 are made as small as possible, and uniform seamless splicing is achieved.

As a backlight source, compared with a traditional light emitting diode, the micro light emitting diode light board 12 has a smaller size and can achieve finer dynamic control and improve a dynamic contrast of the display apparatus.

The micro light emitting diode light board 12 includes micro light emitting diodes 122, and sizes of chips of the micro light emitting diodes in the micro light emitting diode light board 12 are at a micron level. In some embodiments, the micro light emitting diode light board 12 is a mini-LED light board.

The micro light emitting diode light board may be formed through two surface mounted manners: POB and COB. POB is short for package on board, and means that LED chips are packaged (large-size bonding pad) and then mounted to a circuit board; and COB is short for chip on board, and means that LED chips are directly mounted on a circuit board.

The two surface mounted manners both can apply to the micro light emitting diode light board in the present application.

Next, a structure of the micro light emitting diode light board formed through COB manner is taken as an example for description in detail.

The micro light emitting diode light board 12 specifically includes: a circuit board 121, micro light emitting diodes 122, a reflective layer 123 and a packaging layer 124.

The circuit board 121 is located on the back plate 11, and a shape of the circuit board 121 is substantially the same as an overall shape of the micro light emitting diode light board 12. Usually, the circuit board 121 is in a plate shape and is rectangular or square as a whole. The circuit board 121 has a length of 200 mm to 800 mm and a width of 100 mm to 500 mm.

In the embodiments of the present application, the circuit board 121 may be a printed circuit board (PCB), the PCB includes an electronic circuit and an insulating layer, and the insulating layer exposes one or more bonding pads in the electronic circuit for welding the micro light emitting diodes and covers remaining parts.

Or, the circuit board 121 may also be an array substrate formed by manufacturing a thin film transistor driving circuit on a base substrate, and a surface of the array substrate has electrodes connected to the thin film transistor driving circuit for welding the micro light emitting diodes.

A base or base substrate of the above circuit board 121 may be made of a flexible material to form a flexible display apparatus.

The circuit board 121 is configured to provide a driving electric signal for the micro light emitting diodes 122. The micro light emitting diodes 122 and the circuit board 121 are separately manufactured, a surface of the circuit board 121 includes a plurality of bonding pads for welding the micro light emitting diodes 122, the micro light emitting diodes 122 are transferred above the bonding pads after being manufactured, the micro light emitting diodes 122 are welded to the circuit board 121 through processes such as reflow soldering, and thus the micro light emitting diodes 122 may be driven to emit light by controlling an input signal of the circuit board 121.

The micro light emitting diodes 122 are located on the circuit board. Electrodes of the micro light emitting diodes 122 are welded to the bonding pads exposed on the circuit board 121 to achieve electric connection therebetween.

In this embodiment, the micro light emitting diodes 122 are different from ordinary light emitting diodes, and specifically refer to micro light emitting diode chips. Since the micro light emitting diodes 122 have small sizes, dynamic light emitting of the backlight module can be controlled to smaller partitions, which contributes to increase picture contrast. In the embodiments of the present application, the size of the micro light emitting diodes 122 is 50 µm to 300 µm.

The micro light emitting diode light board may only include micro light emitting diodes 122 of one color, or micro light emitting diodes of various colors, which is not limited herein.

The reflective layer 123 is located on a surface of a side of the circuit board 121 close to the micro light emitting diodes 122. The reflective layer 123 and the circuit board 121 are substantially same in shape, and the reflective layer 123 includes a plurality of openings for exposing the micro light emitting diodes 122.

The reflective layer 123 is a protective layer located above the circuit board and configured for protecting the circuit board and performing diffuse reflection on the incident light rays. In the embodiments of the present application, the reflective layer 123 may be formed in the way that the surface of the circuit board 121 is coated with white oil or other materials having light reflecting properties and then the areas of the bonding pads for welding the micro light emitting diodes 122 are exposed through processes such as etching.

The reflective layer 123 has reflecting light property, so that when the light rays emitted from the micro light emitting diode light board 122 are reflected to one side of the back plate by elements in the backlight module, the light rays may be reflected to the light emitting side again by the reflective layer 123, thereby improving the efficiency of the light sources.

The packaging layer 124 is located on surfaces of a side of the micro light emitting diodes 122 away from the circuit board 121. The packaging layer 124 may be disposed individually or as a whole layer. When being disposed individually, the packaging layer 124 only covers the surface of the micro light emitting diodes 122, while no layer is disposed in other regions of the circuit board; and when being disposed as the whole layer, the packaging layer 124 covers the whole circuit board 121 and the surfaces of the micro light emitting diodes 122.

The packaging layer 124 is configured to protect the micro light emitting diodes 122 and prevent foreign items from entering the micro light emitting diodes 122. In the embodiment of the present application, the packaging layer 124 may be made of a transparent colloid material, such as silica gel or epoxy resin. The packaging layer 124 may be manufactured in a point coating or whole-face coating mode.

It is noted that, although the reflective layer 123 in this embodiment has the reflecting effect, in some embodiments, when high reflection is required, a reflective layer such as a reflective sheet may be further disposed on the light board 12, and similarly, the reflective sheet is provided with openings for exposing the micro light emitting diodes.

The diffusion layer 13 is located on the light emitting side of the micro light emitting diode light board 12. The diffusion layer 13 is disposed on the light emitting side of the micro light emitting diode light board 12 as a whole layer, and a shape of the diffusion layer 13 is substantially same as the shape of the micro light emitting diode light board 12. Usually, the diffusion layer 13 may be rectangular or square.

The diffusion layer 13 is configured to scatter the incident light rays to make the light rays passing the diffusion layer 13 more uniformly. Scattering particle materials are disposed in the diffusion layer 13, and the light rays will be refracted and reflected continuously after entering the scattering particle materials, so that the effect of dispersing the light rays is achieved to achieve light uniformizing.

The diffusion layer 13 may adopt two forms, a diffusion plate or a diffusion sheet. The diffusion plate may be adopted when applied to a large display apparatus such as a television; while the diffusion sheet may be adopted when applied to a small display apparatus such as a mobile phone and a smart watch.

A thickness of the diffusion plate is larger than that of the diffusion sheet and is 1.5 mm to 3 mm. The diffusion plate has the larger haze and better uniformizing effect, and usually may be processed through an extrusion process. A material for the diffusion plate is generally selected from at least one of polymethyl methacrylate (PMMA), polycarbonate (PC), polystyrene (PS) or polypropylene (PP).

A thickness of the diffusion sheet is 0.3 mm or less, and the diffusion sheet is relatively thin and more applicable to small and light display apparatuses. According to the diffusion sheet, a base material is usually coated with diffusion particles, the base material may adopt polyethylene terephthalate (PET) or glass, and the diffusion particles may adopt titanium dioxide, zinc oxide, calcium oxide and the like.

Referring to FIG. 9, a vertical distance h between the diffusion layer 13 and the circuit board 121 is also called an optical distance (OD), a ratio h/p of the vertical distance h between the diffusion layer 13 and the circuit board 121 to a distance p between every two adjacent micro light emitting diodes 122 may indicate the overall thickness of the backlight module and a relative quantity of the micro light emitting diodes 122. The smaller the h/p value, the smaller the optical distance, and the thinner the whole device; and the larger the distance between the adjacent micro light emitting diodes, the fewer micro light emitting diodes required, so the cost is lowered.

In a backlight module with light emitting diodes as light sources used in related art, lens need to be used together with the light emitting diodes, a height of the lens reaches about 5 mm, and the h/p value is about 0.3, but design of the OD being 5 mm or less cannot be achieved.

In the embodiments of the present application, in order to reduce the thickness of the backlight module, the micro light emitting diode light board 12 is adopted, no lens is disposed on the light emitting side of the micro light emitting diodes 122, light intensity emit from the micro light emitting diodes 122 is distributed according to Lamber body, and its property is that the brightness is high over the micro light emitting diodes 122, while the brightness is low at junctions of adjacent micro light emitting diodes. If the uniformity of backlight is required, the h/p value needs to reach 0.6 or above, for example, about 40,000 micro light emitting diodes are required by a 65-inch display, and apparently, the cost is high.

In view of the above issue, referring to FIG. 9, the display apparatus according to the embodiments of the present application further includes an angle selection layer 14.

The angle selection layer 14 is located on the light emitting side of the micro light emitting diode light board 12. In the embodiment of the present application, the angle selection layer 14 is disposed as a whole layer to be formed on the light emitting side of the micro light emitting diode light board 12. The angle selection layer 14 may be prepared through an optical coating, and its specific form may be an optical film.

The angle selection layer 14 is configured to reflect the light rays with the first incident angle range and transmit the light rays with the second incident angle range. The incident angle value corresponding to the first incident angle range is smaller than the incident angle value corresponding to the second incident angle range.

The incident angle of the light rays entering into the angle selection layer 14 is equal to an angle of the light rays emitted from the micro light emitting diodes 122, and thus the first incident angle range corresponds to an emitting angle range in which the emitting light intensity of the micro light emitting diodes 122 is high, and the second incident angle range corresponds to an emitting angle range in which the emitting light intensity of the micro light emitting diodes 122 is low.

The angle selection layer 14 may select to reflect the light rays with a small incident angle and transmit the light rays with a large incident angle. Meanwhile, the reflective layer 123 on the micro light emitting diode light board may conduct diffuse reflection on the light rays reflected by the angle selection layer 14 and the light rays re-enter the angle selection layer 14, so that light rays of a second incident angle subjected to the diffuse reflection are transmitted while light rays of a first incident angle continue to repeat the described reflection operation.

Through the reflecting effect of the angle selection layer 14 and the reflective layer 123 to the light rays, the light intensity of a small angle range over the micro light emitting diodes 122 may be finally weakened, while the light intensity of a large angle range at junction areas of the micro light emitting diodes 122 may be finally enhanced, so that the light rays at all emitting angles of the micro light emitting diodes 122 are relatively uniform, and the light emitting uniformity of the micro light emitting diode light board 12 is improved.

In the embodiments of the present application, the angle selection layer 14 is disposed on the light emitting side of the micro light emitting diode light board 12, by adjusting the distance between the micro light emitting diode light board and the angle selection layer 14, the hip value may be in a range from 0.15 to 0.67, and thus requirements of display apparatuses of different specifications are met.

In the embodiments of the present application, since the light intensity of the micro light emitting diodes 122 is high at an area close to a light emitting center and is low at an area away from the light emitting center, the first incident angle range corresponds to 0° to 70°, and the second incident angle range corresponds to 70° or above. In this way, the angle selection layer 14 may achieve the effects of reflection enhancement to incident light rays of 0° to 70° and transmittance enhancement to incident light rays of 70° or above, so that the incident light rays within the angle range of the higher light intensity are reflected, the incident light rays within the angle range of the lower light intensity are transmitted, finally uniform light intensity distribution is achieved, and a light intensity difference of the emitting center and the junction areas of the micro light emitting diodes is reduced.

Since the closer to the emitting center, the higher the light intensity of the micro light emitting diodes, in the embodiments of the present application, the reflectivity of the angle selection layer 14 to the light rays with the first incident angle range is decreased with increasing of the incident angle, that is, the angle selection layer 14 has the more obvious reflecting effect to the emitting light rays closer to the area of the light emitting center, the angle selection layer 14 has the more obvious transmitting effect to the emitting light rays closer to edge areas, after the reflected light rays are subjected to the circulating reflecting effect of the angle selection layer 14 and the reflective layer 123, transmittance of small-angle light rays will be decreased, transmittance of large-angle light rays will be increased, and finally the light intensity is uniformized.

Therefore, in the embodiments of the present application, the angle selection layer 14 is configured that: the larger the angle of the incident light rays, the smaller the reflectivity to the incident light rays; and the larger the angle of the incident light rays, the larger the transmittance to the incident light rays.

In the embodiments of the present application, the reflectivity of the angle selection layer 14 to the light rays with the first incident angle range is 10% to 80%, and the reflectivity of the angle selection layer 14 to the light rays with the second incident angle range is less than 10%. For the incident light rays with the first incident angle range, the angle selection layer 14 is disposed to have the highest reflectivity to light rays entering perpendicular to the light emitting center, and with increasing of the incident angle, the reflectivity of the angle selection layer 14 to the incident light rays is lowered; and for the incident light rays with the second incident angle range, the transmittance of the angle selection layer 14 is increased with increasing of the incident angle.

Figure 10:
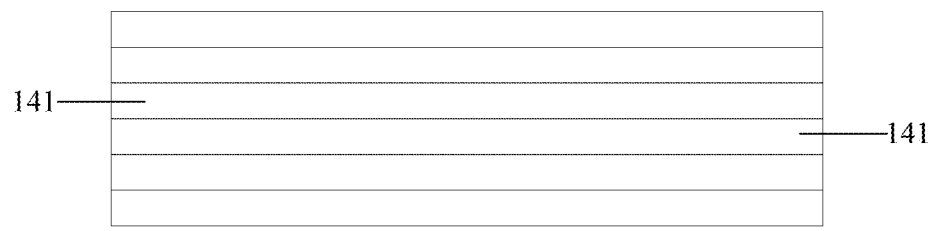
FIG. 10 is a first schematic cross-sectional view of an angle selection layer according to an embodiment of the present application.

FIG. 10 is a schematic cross-sectional view of the angle selection layer according to an embodiment of the present application.

The angle selection layer includes a plurality of film layers 141 disposed in a laminated mode, and two adjacent film layers 141 has different refraction indexes. The film layers 141 in the angle selection layer may adopt optical films and be manufactured through an optical coating process with polymer materials such as polyhexafluoropropylene oxide, polytrifluoroethyl methacrylate and polymethylhydrosiloxane.

A thickness of the angle selection layer is 50 μm to 60 μm, and the thickness is small relative to other optical film layers in the backlight module, so that the impact on the overall thickness of the backlight module is little.

Next, the work principle of transmittance and reflection enhancement of the angle selection layer 14 to the incident light rays is specifically described.

Figure 11:
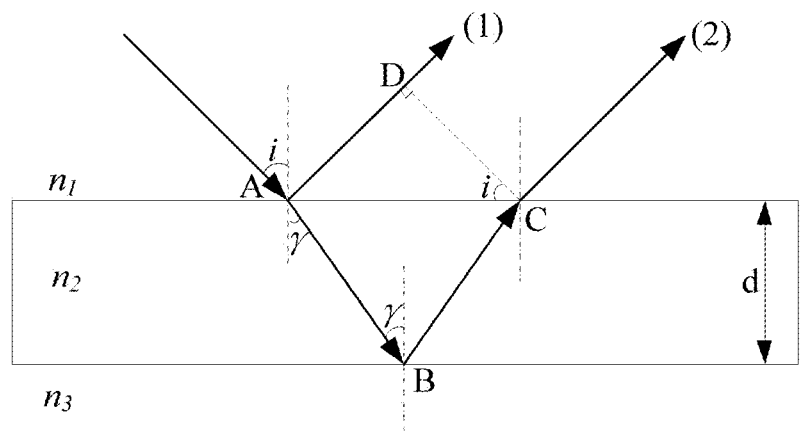
FIG. 11 is a schematic diagram of a working principle of an angle selection layer according to an embodiment of the present application.

FIG. 11 is a schematic diagram of the work principle of the angle selection layer according to an embodiment of the present application.

Referring to FIG. 11, when light rays enter a surface of a thin film with a refraction index $n_2$ from a medium with a refraction index $n_1$ with an incident angle i, light reflection and refraction occur at an interface of two media with indexes $n_1$ and $n_2$, a reflection angle and the incident angle are equal and are still i, and a refraction angle is γ; and when refracted light rays enter a lower surface of the thin film, light reflection and refraction also occur on the lower surface, wherein reflected light rays will pass an upper surface of the thin film to be refracted in the medium with an index $n_1$, and thus two beams of reflected light rays (1) and (2) are formed on the upper surface and the lower surface of the thin film. An optical path difference δ' between the reflected light ray (1) and the reflected light ray (2) is:

$$\delta' = n_2(\overline{AB}+\overline{BC}) - n_1\overline{AD}.$$

If a thickness of the thin film with the refraction index being $n_2$ is d and the thickness of the thin film is uniform, due to $\overline{AB}=\overline{BC}=d/\cos\gamma$ and $\overline{AD}=\overline{AC}\sin i=2d\tan\gamma\times\sin i$, the following may be obtained:

$$\delta' = n_2 2\overline{AB} - n_1\overline{AD} = \frac{2n_2 d}{\cos\gamma} - 2n_1 d\tan\gamma \times \sin i = \frac{2d}{\cos\gamma}(n_2 - n_1\sin i \sin\gamma).$$

It can be known from the refraction law that:

$$n_1 \sin i = n_2 \sin\gamma;$$

$$\delta' = \frac{2dn_2}{\cos r}(1-\sin^2\gamma) =$$

-continued $$\frac{2n_2 d}{\cos\gamma}\cos^2\gamma = 2n_2 d\cos\gamma = 2n_2 d\sqrt{1-\sin^2\gamma} = 2d\sqrt{n_2^2 - n_1^2\sin^2 i}.$$

so:

It can be seen from the above formula that, if a multi-layer film structure is disposed, an optical path difference between reflected light of the light rays on the upper and lower surfaces of each layer of medium is only related to a refraction index and a thickness of this layer and an incident angle. In practical applications, light rays usually enter a thin film from an air medium, light reflection occurs on an upper surface and a lower surface of the thin film, that is, the refraction index in the above formula is $n_1=1$, and thus the above formula may be simplified as:

$$\delta'=2d\sqrt{n_2^2-n_1^2\sin^2 i}=2d\sqrt{n_2^2-\sin^2 i}.$$

It can be known from the Thin-film interference law that, when the optical path difference between the reflected light rays on the upper surface and the lower surface of the thin film is integer times of a wavelength, the two beams of light rays are coherently added; and when the optical path difference between the reflected light rays on the upper surface and the lower surface is odd times of a half-wavelength, the two beams of light rays are coherently subtracted. According to the law of conservation of energy, if the reflected light is coherently added, energy of the reflected light is enhanced, and energy of transmission light is weakened; and if the reflected light is coherently subtracted, the energy of the reflected light is weakened, and the energy of the transmission light is enhanced.

When the above principle is applied to the embodiments of the present application, for any film layer 141 in the angle selection layer 14, an incident angle of reflection enhancement is set as $\theta_1$ and an incident angle of transmittance enhancement is set as $\theta_2$, so that when emitting light of the micro light emitting diodes 122 enter the angle selection layer 14, light rays with the incident angle $\theta_1$ may be subjected to reflection enhancement, and light rays with the incident angle $\theta_2$ may be subjected to transmittance enhancement.

It can be seen that as long as the refraction indexes and thicknesses of the film layers 141 meet a condition of reflecting the light rays with the first incident angle range and transmitting the light rays with the second incident angle range, the same film layer 141 may have the effects of reflection enhancement and transmittance enhancement to different incident angles.

The angle selection layer 14 includes the plurality of film layers 141 disposed in the laminated mode, and each film layer 141 may have the effect of reflection enhancement for different first incident angles and the effect of transmittance enhancement for the second incident angles. By disposing the plurality of film layers 141, the effect of reflection enhancement is achieved for the light rays within the first incident angle range, and the effect of transmittance enhancement is achieved for the light rays within the second incident angle range.

In the embodiments of the present application, the angle selection layer includes multiple groups of film layers, wherein each group includes a plurality of film layers, and the film layers has different refraction indexes and thicknesses. If the refraction index of a certain film layer in the film layer group is n1, a thickness thereof is d1, and the film layer is configured to reflect 0° incident light rays and transmit 70° incident light rays, a following relation may be concluded from the above formulas:

$$2d_1\sqrt{n_1^2-\sin^2 0°}=m\lambda;$$

$$2d_1\sqrt{n_1^2-\sin^2 70°}=(m-0.5)\lambda.$$

The following may be obtained by dividing the above two formulas:

$$n_1\sqrt{n_1^2-\sin^2 70°}=m/(m-0.5).$$

Wherein m is a positive integer, and λ is a wavelength of the incident light rays.

In a case where a material of the film layers 141 has a determined refraction index, the thickness of the film layers 141 may be figured out according to the above, so that the film layers may have the effect of reflection enhancement to the 0° incident light rays and the effect of transmittance enhancement to the 70° incident light rays.

Similarly, another film layer may be disposed in the above film layer group to achieve the effect of reflection enhancement to 30° incident light rays and the effect of transmittance enhancement to 80° incident light rays, and another film layer may be disposed to achieve the effect of reflection enhancement to 60° incident light rays and the effect of transmittance enhancement to 90° incident light rays, so that the film layer group have the effects of reflection enhancement to the incident light rays of 0° to 70° and transmittance enhancement to the incident light rays of 70° or above.

By disposing the plurality of film layer groups, the effect of reflection enhancement for the light rays within the first incident angle range and the effect of anti-reflection for the light rays within the second incident angle range by the angle selection layer 14 may be enhanced. The effect of adjusting the reflectivity and the transmittance may also be achieved by adjusting the quantity of the film layers.

In some embodiments, the light sources of the backlight module according to the embodiment of the present application may be white light sources, so film layers for reflection enhancement for the first incident angle and transmittance enhancement for the second incident angle need to be disposed for three components, namely red, green and blue, in white light respectively.

In some embodiments, the light sources of the backlight module according to the embodiments of the present application are single-color light sources, and the single-color light sources need to be matched with a color conversion layer for use.

In some embodiments, the light sources are blue light sources, so in this case, a wavelength conversion layer such as a quantum dot layer may be used together, and red quantum dot materials and blue quantum dot materials are mixed in the quantum dot layer, so that transmitted blue light as well as red light and green light emitted by excitation for three primary lights to achieve full-color display.

When the blue light sources are adopted, incident light entering the film layers in the angle selection layer is fixed in wavelength which is in a wavelength range corresponding to blue light, and thus the film layers only need to be disposed for the wavelength of the blue light to perform reflection enhancement on a plurality of first incident angle ranges and transmittance enhancement on a plurality of second incident angle ranges at the same time. A value range of the first incident angle is smaller than a value range of the second incident angle.

Figure 12:
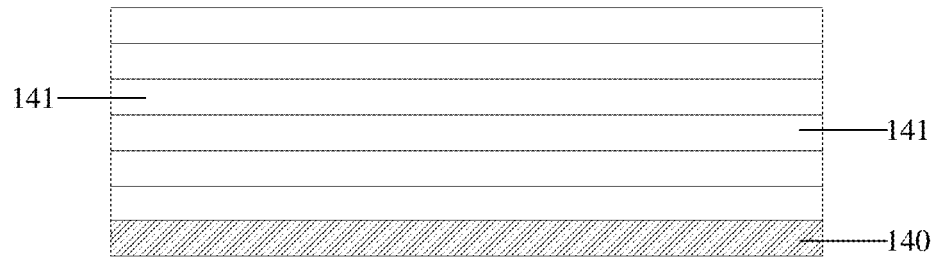
FIG. 12 is a second schematic cross-sectional view of an angle selection layer according to an embodiment of the present application.

FIG. 12 is a second schematic cross-sectional view of the angle selection layer according to an embodiment of the present application.

Referring to FIG. 12, the backlight module further includes a base material 140 configured to support the film layers disposed in the laminated mode.

The base material 140 and the film layers 141 have substantially the same shape and size, usually, the shape may be a rectangle, and the size is matched with the size of the micro light emitting diode light board 12.

The base material 140 has a support effect, the film layers 141 in the angle selection layer 14 are mostly optical films with the thickness being at a nanometer to micron scale, if the film layers are separately formed, mounting is relatively difficult in an mounting process of the module, and therefore the film layers 141 are formed on a surface of the base material 140 and then the base material 140 and the film layers 141 are transferred to a corresponding area in the backlight module together, so that the base material 140 also has a certain protecting effect for the film layers 141.

A material of the base material 140 may be polyethylene terephthalate (PET) and the like, which is not limited here.

Figure 13:
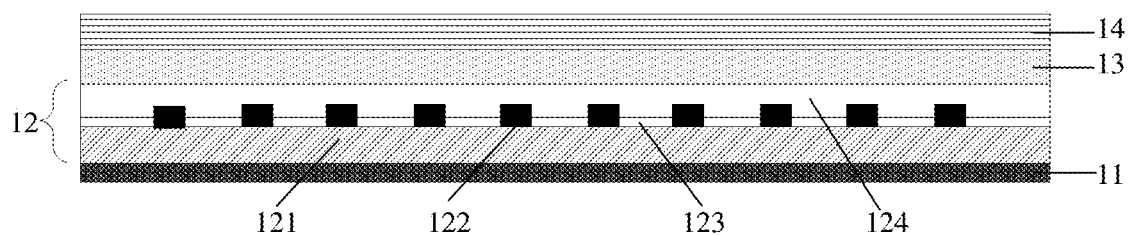
FIG. 13 is a second schematic cross-sectional view of a backlight module according to an embodiment of the present application.

FIG. 13 is a second schematic cross-sectional view of the backlight module according to an embodiment of the present application.

Referring to FIG. 9 and FIG. 6, the positions of the diffusion layer 13 and the angle selection layer 14 in the embodiment of the present application may be flexibly set.

As shown in FIG. 9, the angle selection layer 14 is located on a side close to the micro light emitting diode light board 12, and the diffusion layer 13 is located on a side of the angle selection layer 14 away from the micro light emitting diode light board 12.

Disposing the angle selection layer 14 between the diffusion layer 13 and the micro light emitting diode light board 12 contributes to increase the vertical distance between the micro light emitting diodes 122 and the diffusion plate 13, namely increasing the OD, so that the light mixing effect of the micro light emitting diodes 122 can be improved.

As shown in FIG. 12, the diffusion layer 13 is located on a side close to the micro light emitting diode light board 12, and the angle selection layer 14 is located on a side of the diffusion layer 13 away from the micro light emitting diode light board 12.

Disposing the diffusion layer 13 between the micro light emitting diode light board 12 and the angle selection layer 14 facilitates to increase the distance between the angle selection layer 14 and the micro light emitting diode light board 12, and the larger the distance therebetween, the farther the position of light rays re-entering the angle selection layer 14 after being reflected, so that a light illumination range of the micro light emitting diodes 122 is expanded.

However, in the embodiment shown FIG. 12, a minimum h/p value achieving good backlight uniformity is greater than the h/p value in the embodiment where the angle selection layer is disposed on an incident side of the diffusion layer (the diffusion plate, or the diffusion sheet or a quantum dot film).

The backlight module in the embodiment of the present application may achieve the small h/p value on the premise of guaranteeing uniform backlight, so that the overall thickness of the backlight module is reduced, the using quantity of the micro light emitting diodes is reduced under the same size, and the cost is controlled.

In the present application, brightness distribution conditions of the backlight module without an angle selection layer in the related art and the backlight module adopting the angle selection layer in the embodiment of the present application are further subjected to comparison testing.

When the h/p value is 0.22, brightness distribution uniformity of the backlight module in the embodiment of the present application is remarkably improved.

Figure 14A:
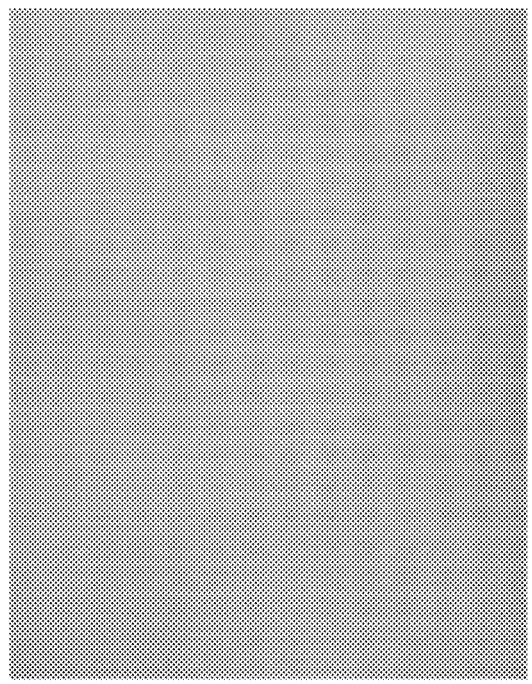
FIG. 14A is a light emitting brightness distribution effect diagram of a backlight module in related art.

FIG. 14A shows a schematic diagram of brightness distribution of the backlight module without an angle selection layer in the related art. It can be seen from FIG. 14A that many discrete bright spots occur in the backlight module, a circle of dark region is formed around the bright spots, and brightness distribution is not uniform.

Figure 14B:
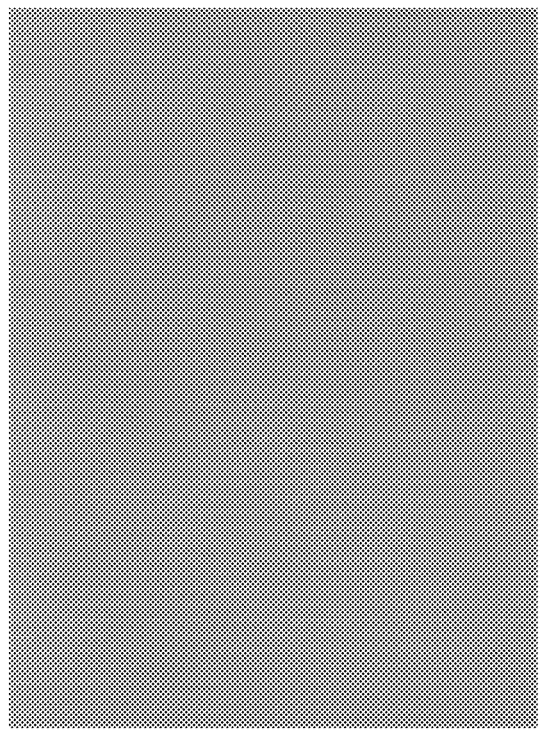
FIG. 14B is a light emitting brightness distribution effect diagram of a backlight module according to an embodiment of the present application.

FIG. 14B shows a schematic diagram of brightness distribution of the backlight module adopting the angle selection layer in the embodiment of the present application. It can be seen from FIG. 14B that through the circulating reflecting effect of the angle selection layer and the reflective layer in the micro light emitting diode light board in the embodiment of the present application, brightness spots are eliminated, and brightness distribution is uniform, which meets the backlight requirement.

The backlight module shown in FIG. 9 and FIG. 13 may achieve backlight design of a small OD value. Directly disposing the angle selection layer 14 and the diffusion layer 13 on the micro light emitting diode light board 12 may reduce the OD value to 1 mm or below to achieve the design of an ultra-thin module.

The angle selection layer 14 may be directly attached to the surface of the micro light emitting diode light board 12, so that the base material 140 is omitted and the thickness is reduced on the whole.

Or, when the backlight module is applied to a display apparatus such as a large-size television, the diffusion layer 13 may adopt the diffusion plate, and the angle selection layer 14 may be directly attached to the surface of the diffusion plate, so that the base material 140 is omitted. The diffusion plate has the effect of diffusion and the effect of supporting the angle selection layer 14 at the same time.

Or, when the backlight module is applied to a display apparatus such as a small-size mobile terminal, the diffusion layer 13 may adopt the diffusion sheet, and the angle selection layer may be directly attached to the base material of the diffusion plate without separately disposing the base material for the angle selection layer 14, so that one base material may be omitted, and the diffusion sheet has the effect of diffusion and the effect of supporting the angle selection layer 14 at the same time.

Or, the angle selection layer 14 may be disposed on the base material 140 and then transferred with the base material to the corresponding position of the backlight module together. The angle selection layer 14 with the base material 140 is easier to mount to avoid damage during mounting.

Figure 15:
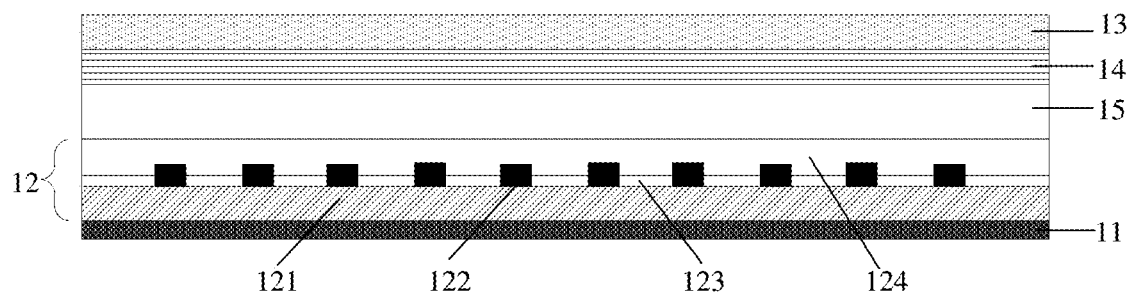
FIG. 15 is a third schematic cross-sectional view of a backlight module according to an embodiment of the present application.

FIG. 15 is a third schematic cross-sectional view of the backlight module according to an embodiment of the present application.

Referring to FIG. 15, in another embodiment of the present application, the backlight module further includes a transparent substrate 15, and the transparent substrate 15 is located between the micro light emitting diode light board 12 and the diffusion layer 13.

The transparent substrate 15 and the micro light emitting diode light board 12 are substantially the same in shape, the micro light emitting diode light board 12 is coated with the whole packaging layer, and the transparent substrate 15 is directly placed on the packaging layer of the micro light emitting diode light board 12. The transparent substrate adopts a material with a high transmittance such as polymethyl methacrylate (PMMA) or glass.

As a supporting structure of the diffusion layer 13, the transparent substrate 15 makes the micro light emitting diode light board 12 and the diffusion layer 13 have a certain distance, so that light emitted from the micro light emitting diodes 122 is fully mixed before reaching the diffusion layer 13, and the backlight brightness uniformity is improved.

The structure that the transparent substrate 15 is disposed on the micro light emitting diode light board 12 is more suitable for design of a backlight module with a large OD value.

The angle selection layer 14 may be directly attached to the transparent substrate 15, so that the base material 140 may be omitted, components used in the backlight module are reduced, and the thickness is reduced.

Figure 16:
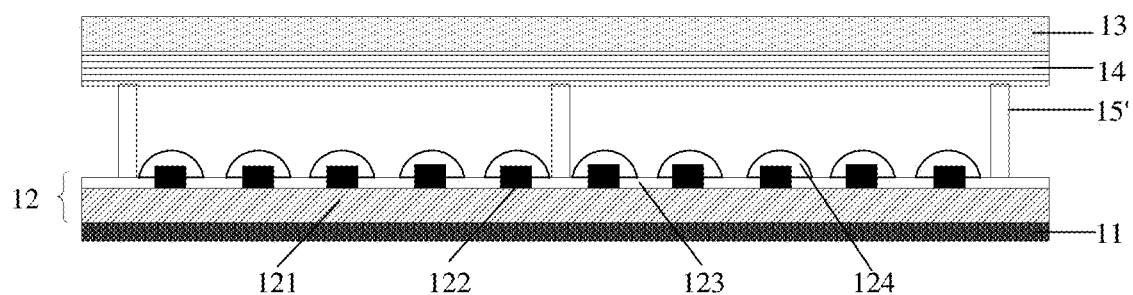
FIG. 16 is a fourth schematic cross-sectional view of a backlight module according to an embodiment of the present application.

FIG. 16 is a fourth schematic cross-sectional view of the backlight module according to an embodiment of the present application.

Referring to FIG. 16, in another embodiment of the present application, the backlight module further includes transparent supports 15', and the transparent supports 15' are located on the micro light emitting diode light board 12 and are configured to support the diffusion layer 13.

The micro light emitting diode light board 12 is spot-coated with a packaging material, there is a gap between adjacent micro light emitting diodes, and the transparent supports 15' are disposed at the positions of these gaps to support the diffusion layer 13 so as to make a certain distance between the diffusion plate 13 and the micro light emitting diodes 122 to increase the OD value.

The angle selection layer 14 may be directly attached to the surface of the diffusion layer 13, so that the base material 140 is omitted, and the diffusion layer may achieve the supporting effect for the angle selection layer.

Figure 17:
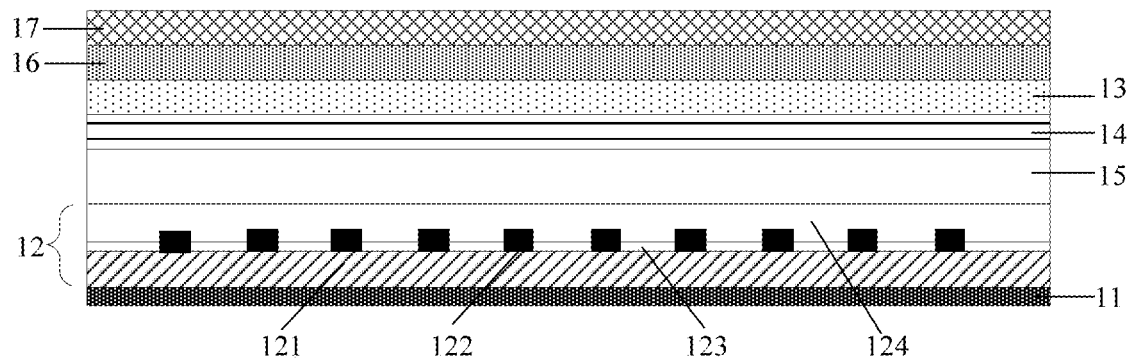
FIG. 17 is a fifth schematic cross-sectional view of a backlight module according to an embodiment of the present application.

FIG. 17 is a fifth schematic cross-sectional view of the backlight module according to an embodiment of the present application.

Referring to FIG. 17, the backlight module in the embodiment of the present application further includes a quantum dot layer 16 and an optical film 17. The quantum dot layer 16 functions as wavelength conversion layer, and the wavelength conversion layer in the embodiment of the present application is not limited to the quantum dot layer and may also be a fluorescent powder layer and the like.

The quantum dot layer 16 is located on a side of the diffusion layer 13 away from the micro light emitting diode light board 12. The quantum dot layer 16 is disposed as a whole layer, and a shape of the quantum dot layer 16 is substantially same as that of the micro light emitting diode light board 12 and usually may be a rectangle or a square.

The quantum dot layer 16 is used together with single-color micro light emitting diodes. In the embodiment of the present application, the micro light emitting diodes are blue light micro light emitting diodes. The quantum dot layer 16 has two quantum dot materials, wherein one is red quantum dot material, with a wavelength of light excited by blue light being about 620 nm to 640 nm; and the other is green quantum dot material, with a wavelength excited by the blue light being about 520 nm to 540 nm. Red light and green light emitted by excitation from the quantum dot layer 16 are mixed with transmitted blue light to form white light so as to provide backlight for the panel.

The optical film 17 is located on a side of the quantum dot layer 16 away from the diffusion layer 13. The optical film 17 is disposed as a whole layer, and a shape of the optical film 17 is substantially same as that of the micro light emitting diode light board 12 and usually may be a rectangle or a square.

Disposing the optical film 17 may make the backlight module adaptive to various practical applications.

The optical film 17 may include a prism sheet, and the prism sheet may change an emitting angle of light rays to change a viewing angle of the display apparatus.

The optical film may further include a reflective polarizer. As a brightness enhancement sheet, the reflective polarizer may increase the brightness of the backlight module, improve efficiency of light rays, and make emitting light rays have a polarizing property, so use of a polarizer in the liquid crystal panel is omitted.

Figure 18:
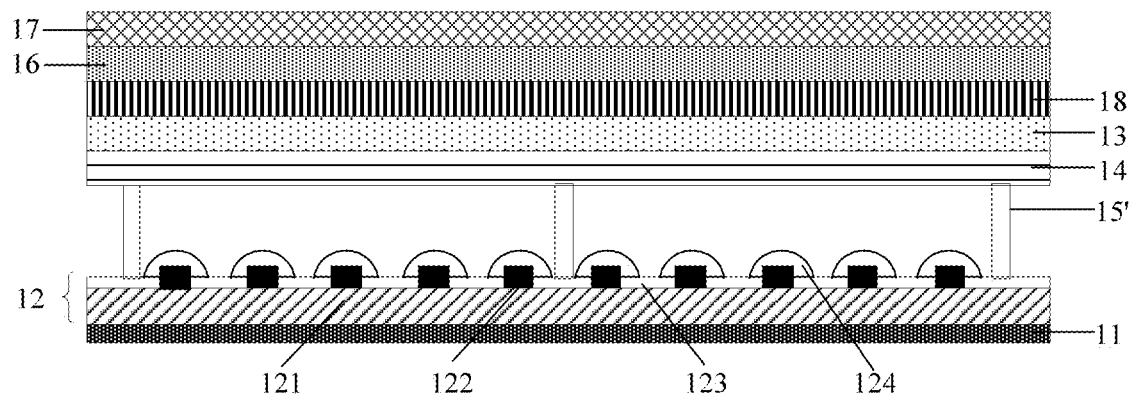
FIG. 18 is a sixth schematic cross-sectional view of a backlight module according to an embodiment of the present application.

FIG. 18 is a sixth schematic cross-sectional view of the backlight module according to an embodiment of the present application.

Referring to FIG. 18, in another embodiment of the present application, the backlight module further includes an anti-reflection film 18 which is located on a side of the quantum dot layer 16 facing the micro light emitting diode light board 12.

The transmittance-enhancing film 18 is configured to increase transmittance of blue light and enhance reflection of red light and green light, so that light rays entering the quantum dot layer 16 may all be blue light, and an excitation rate of the quantum dot layer 16 is increased. Meanwhile, it is guaranteed that red light and green light emitted to one side of the panel are both excited by the quantum dot layer 16, so that a high color gamut is achieved.

Next, a structure of the micro light emitting diode light board formed through a POB packaging is described.

The micro light emitting diode light board includes a circuit board and micro light emitting diodes 122' located on the circuit board. The micro light emitting diodes 122' are devices with micro light emitting diode chips 1221', and see FIG. 19 for the specific structure.

Figure 19:
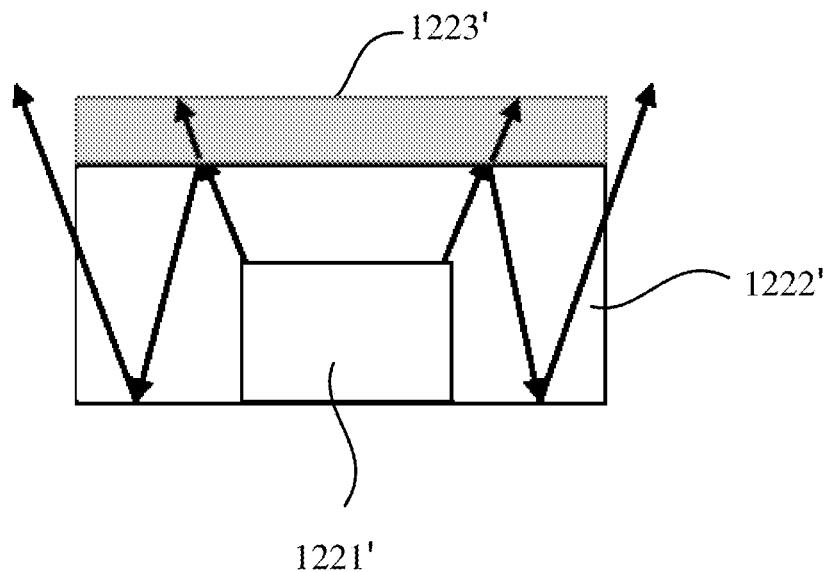
FIG. 19 is a schematic structural diagram of a micro light emitting diode according to an embodiment of the present application.

As shown in FIG. 19, the micro light emitting diodes 122' include the micro light emitting diode chips 1221' and individual packaged supports 1222', and the micro light emitting diode chips 1221' are placed at the bottoms of the encapsulation supports 1222'.

To further lower the OD value, the micro light emitting diodes 122' further include top shielding layers 1223' located on a light emitting side of the micro light emitting diode chips 1221'.

The top shielding layers 1223' are formed by mixing scattering particles, such as titanium dioxide, in glue. The existence of the top shielding layers 1223' can increase a light emitting angle of the micro light emitting diode chips 1221'. In a case where the quantity and distance of the micro light emitting diodes 122' are not changed, an illumination range of the micro light emitting diodes 122' may be expanded, and the OD value is further reduced.

When the micro light emitting diode light board in this embodiment is used, a reflective sheet is often required to be used together as a reflective layer to achieve the effect jointly.

The angle selection layer in the present application can also apply to an scenario where a lens is disposed on the light sources. Description is made in combination with the structure of the micro light emitting diode light board with COB packaging below, and it is noted that it is not limited to the micro light emitting diode light board with COB packaging.

Figure 20:
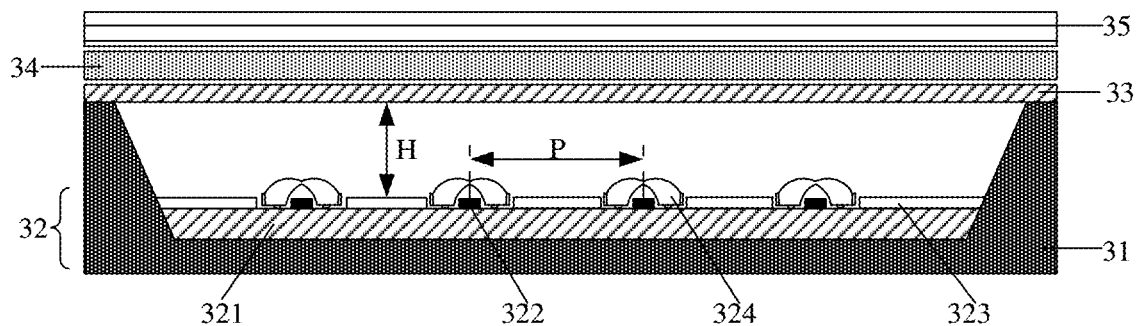
FIG. 20 is a schematic cross-sectional view of a backlight module according to some embodiments of the present application.

FIG. 20 is a schematic cross-sectional view of a backlight module according to an embodiment of the present application.

Referring to FIG. 20, the backlight module includes: a back plate 331, a micro light emitting diode light board 32, a functional layer 33, an angle selection layer 34 and an optical film 35.

In the embodiment of the present application, the micro light emitting diode light board 32 includes: a circuit board 321, micro light emitting diodes 322, a reflective layer 323 and one or more light uniformizing components 324.

The micro light emitting diode light board according to an embodiment of the present application further includes a packaging layer not shown in the figure, and the packaging layer is located on surfaces of a side of the micro light emitting diodes 322 away from the circuit board 321. The packaging layer has individual patterns, the surfaces of the micro light emitting diodes 322 are spot-coated with the packaging layer, and no pattern is disposed in other regions of the circuit board 321.

The packaging layer is configured to protect the micro light emitting diodes 322 and prevent foreign items from entering the micro light emitting diodes 322. In the embodiments of the present application, the packaging layer may be made of a transparent material, such as silica gel or epoxy resin.

The one or more light uniformizing component 324 is located on a light emitting side of the micro light emitting diodes 322. The light uniformizing components 324 have one to one correspondence with the micro light emitting diodes, and one light uniformizing component 324 is disposed on the light emitting side of each micro light emitting diode 322 for uniformizing light rays emitting from the micro light emitting diodes 322.

Since the micro light emitting diodes 322 are used as backlight sources in the embodiment of the present application, energy distribution of emitting light of the micro light emitting diodes 322 meets Lambertian distribution, energy over the micro light emitting diodes 322 is high, while energy at junction areas of the adjacent micro light emitting diodes 322 is weak.

In the embodiments of the present application, the light uniformizing components 324 are disposed on the light emitting side of the micro light emitting diodes 322 to uniformize the light rays emitted from the micro light emitting diodes 322, and thus an energy difference within a small-angle emitting range and a large-angle emitting range of the micro light emitting diodes 322 is reduced.

The uniformized light rays will enter the angle selection layer 33, and a reflectivity of the angle selection layer 33 to the incident light rays is decreased with angle increase of the incident light rays. That is, the larger the angle of the incident light rays, the smaller the reflectivity of the angle selection layer 33 to the incident light rays; and the larger the angle of the incident light rays, the larger a transmittance of the angle selection layer to the incident light rays. Thus, most small-angle light rays entering the angle selection layer 33 will be reflected by the angle selection layer 33, while most large-angle light rays entering the angle selection layer 33 will be transmitted by the angle selection layer 33. The reflected small-angle light rays re-enter the reflective layer 323 and re-enter the angle selection layer 33 after being subjected to the diffuse reflection effect of the reflective layer 323, and after multiple times of reflection between the angle selection layer 33 and the reflective layer 323, finally emitting light rays are further uniformized.

The light uniformizing components 324 and the angle selection layer 33 are utilized to uniformize the emitting light rays of the micro light emitting diodes 322 in the embodiments of the present application, so that a vertical distance from the micro light emitting diode light board 32 to the diffusion layer 34 and a distance between every two adjacent micro light emitting diodes 322 meet a following relationship: $H/P \leq 0.2$.

Referring to FIG. 20, H represents the vertical distance from the micro light emitting diode light board 32 to the diffusion layer 34, and P represents the distance between every two adjacent micro light emitting diodes 322.

The vertical distance H between the micro light emitting diode light board 32 and the diffusion layer 34 is also called an optical distance (OD), and the ratio H/P of the vertical distance H between the micro light emitting diode light board 32 and the diffusion layer 34 to the distance P between every two adjacent micro light emitting diodes 322 may indicate an overall thickness of the backlight module. The smaller the H/P value of the quantity of the micro light emitting diodes 322, the smaller the optical distance, and the thinner the whole device. The larger the distance between the adjacent micro light emitting diodes, the fewer the micro light emitting diodes required for use, so that the cost may be lowered.

The structure that the light uniformizing components are combined with the angle selection layer according to an embodiment of the present application may control the H/P ratio to be 0.2 or below, and compared with a structure in the related art that an H/P ratio is 0.3 or above, the backlight module according to an embodiment of the present application may have the smaller thickness, which meets the ultra-thin design of the display apparatus. The quantity of the micro light emitting diodes used is reduced, and the production cost is lowered.

In the embodiments of the present application, as shown in FIG. 20, the light uniformizing components 324 may be disposed as lenses located on the light emitting side of the micro light emitting diodes 322. The lenses correspond to the micro light emitting diodes one to one, and one lens is disposed on the light emitting side of each micro light emitting diode 322.

The lenses include incident surfaces facing a side of the micro light emitting diodes and emitting surfaces away from the side of the micro light emitting diodes, the incident surfaces protrude towards the side away from the micro light emitting diodes to form chambers, and the micro light emitting diodes are located in the chambers, Packaging layers are generally disposed on the surfaces of the micro light emitting diodes, and the micro light emitting diodes and the packaging layers on their surfaces are located in the chambers of the incident surfaces of the lenses.

Through appropriate optical design, surface types of the incident surfaces and the emitting surfaces of the lenses may enable light emitting from the light emitting diodes to enter the lenses first, and optical field distribution of transmitted light rays is adjusted. After the lenses are disposed on the light emitting side of the micro light emitting diodes, light intensity over the micro light emitting diodes and light intensity at junction areas of the adjacent micro light emitting diodes are relatively uniform.

Figure 21:
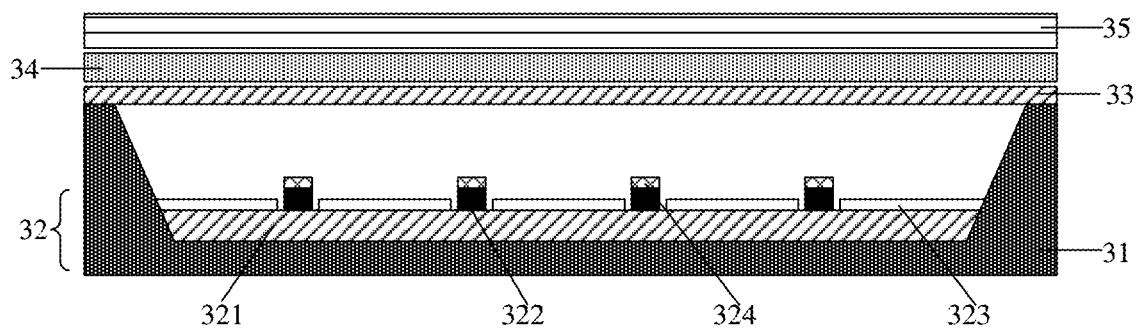
FIG. 21 is a schematic cross-sectional view of a backlight module according to some embodiments of the present application.

FIG. 21 is a schematic cross-sectional view of the backlight module according to some embodiments of the present application.

Referring to FIG. 21, in other embodiments of the present disclosure, the light uniformizing components 324 may be disposed as half-transmittance and half-reflection layers located on the light emitting side of the micro light emitting diodes.

When receiving light rays emitting from the micro light emitting diodes, the half-transmittance and half-reflection layers will transmit a part of the light rays and reflect remaining light rays, and the reflected light rays re-enter the reflective layer 323 and then are emitted to one side of the angle selection layer 33 after subjected to diffuse reflection of the reflective layer 323.

Disposing the half-transmittance and half-reflection layers on the light emitting side of the micro light emitting diodes may reduce the intensity of emitting light over the micro light emitting diodes to make the light rays distributed towards regions away from the region over the micro light emitting diodes, so that the emitting light rays of the micro light emitting diodes are relatively uniform.

As shown in FIG. 21, the micro light emitting diodes 322 are micro light emitting diode chips which are usually of a square structure, and the half-transmittance and half-reflection layers (324) may be directly disposed on light emitting surfaces, namely upper surfaces, of the micro light emitting diodes 322. In this way, all the light rays emitted upwards from the micro light emitting diodes 322 are subjected to the effect of the half-transmittance and half-reflection layers, so that the light intensity of the emitting light rays is relatively uniform after the reflecting effect of the half-transmittance and half-reflection layers and the reflective layer 323.

Figure 22:
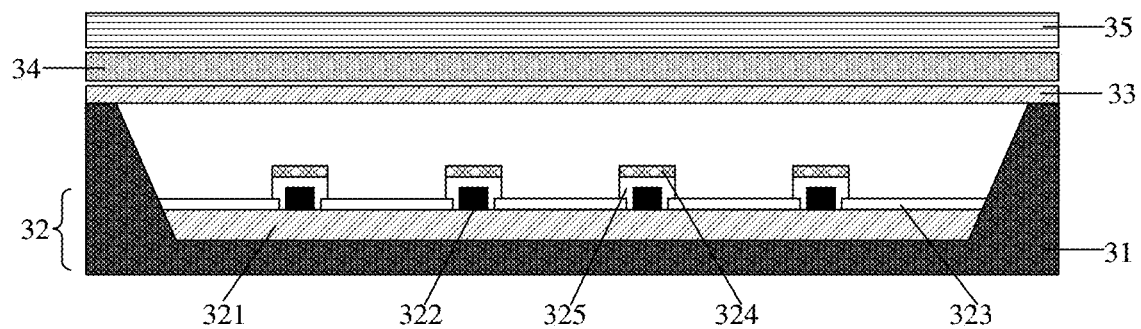
FIG. 22 is a schematic cross-sectional view of a backlight module according to some embodiments of the present application.

FIG. 22 is a schematic cross-sectional view of the backlight module according to some embodiments of the present application.

Referring to FIG. 22, in other embodiments of the present application, protective components 325 are disposed on the surfaces of the micro light emitting diodes 322, and the half-transmittance and half-reflection layers (324) are located on surfaces of a side of the protective components 325 away from the micro light emitting diodes 322.

The protective components 325 on the surfaces of the micro light emitting diodes 322 may be the packaging layers above, and the surfaces of the micro light emitting diodes 322 may be spot-coated with a light transmitting material to form a protective layer.

The protective components may configured for protecting the micro light emitting diodes 322 and may also form a certain distance between the half-transmittance and half-reflection layers (324) and the micro light emitting diodes 322. In this way, the light rays emitted from the micro light emitting diodes 322 enter the half-transmittance and half-reflection layers after passing a certain distance, light rays reflected by the half-transmittance and half-reflection layers are reflected again after entering the reflective layer 323, a path of the reflected light rays is lengthened, and the light rays may be reflected to farther regions, so that the light rays emitted upwards from the micro light emitting diodes can be converted to the junction areas of the adjacent micro light emitting diodes, thereby achieving uniformity of the light rays emitted from the micro light emitting diodes.

The structure that the light uniformizing components 324 and the angle selection layer 33 are used together in the backlight module of the embodiment of the present application may improve the light emitting uniformity of the backlight module.

Figure 23:
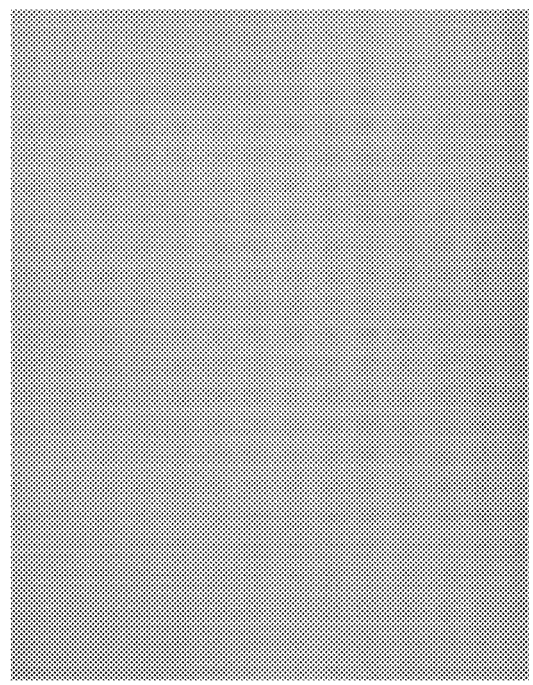
FIG. 23 is a light emitting intensity distribution effect diagram of a backlight module in related art.

FIG. 23 shows a schematic diagram of light intensity distribution of the backlight module without the light uniformizing components 324 or the angle selection layer 33 in the related art. It can be seen from FIG. 23 that many discrete bright spots occur in the backlight module, a circle of dark region is formed around the bright spots, and brightness distribution is not uniform.

Figure 24:
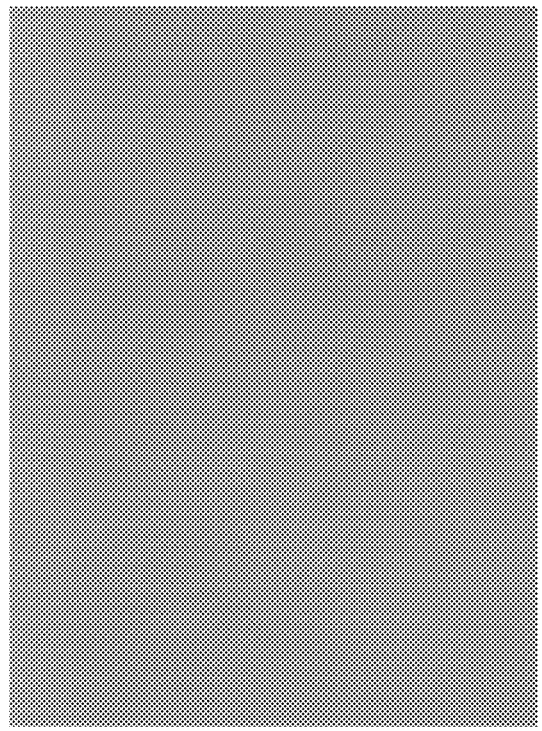
FIG. 24 is a light emitting intensity distribution effect diagram of a backlight module according to an embodiment of the present application.

FIG. 24 shows a schematic diagram of light intensity distribution of the backlight module adopting the light uniformizing components 324 and the angle selection layer 33 in the embodiments of the present application. It can be seen from FIG. 24 that in the embodiments of the present application, through the light uniformizing components 324 and the angle selection layer 33, when the H/P value is reduced to 0.15, light intensity distribution uniformity is still good, which meets requirements like thin backlight module and less micro light emitting diodes.

In order to meet requirements of the production cost and ultra-thin appearance and the like, the present application further provides a display apparatus, and two functional layers are introduced into the display apparatus.

Figure 25:
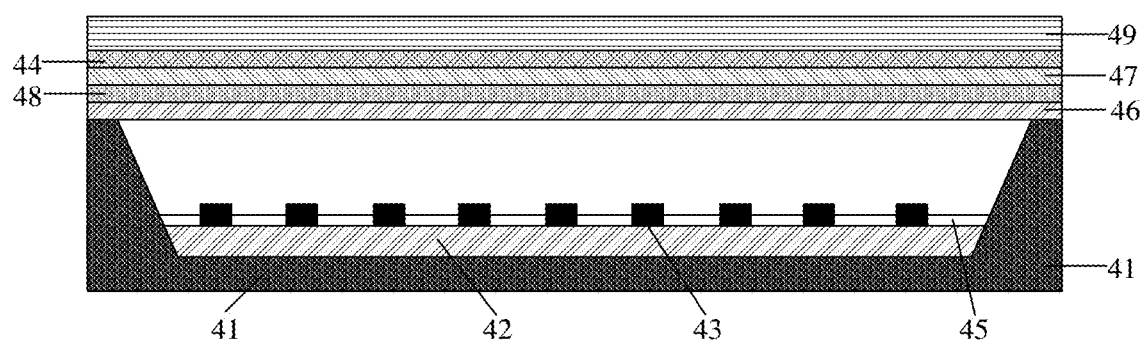
FIG. 25 is a schematic cross-sectional view of a backlight module according to some embodiments of the present application.

FIG. 25 is a schematic cross-sectional view of a backlight module according to some embodiments of the present application.

Referring to FIG. 25, the backlight module according to an embodiment of the present application includes: a back plate 41, a circuit board 42, light sources 43, a wavelength conversion layer 44, a reflective layer 45, a first functional layer 46, a second functional layer 47, a diffusion layer 48 and an optical film 49.

The back plate 41 is located at the bottom of the backlight module and configured for supporting. Usually, the back plate 41 is of a square structure or a rectangular structure, and when the back plate is applied to a special-shaped display apparatus, a shape of the back plate is adapted to a shape of the display apparatus. The back plate 41 includes a top side, a bottom side, a left side and a right side. The top side and the bottom side are opposite, the left side and the right side are opposite, the top side is connected with one end of the left side and one end of the right side, and the bottom side is connected with the other end of the left side and the other end of the right side.

A material of the back plate 41 is aluminum, iron, aluminum alloy or iron alloy. The back plate 41 is configured to fix and support edge areas of components such as the optical film and the diffusion layer, and the back plate 41 is also configured to dissipate heat.

The circuit board 42 is located on the back plate 41, and a shape of the circuit board 42 is substantially same as an overall shape of the back plate 41. Usually, the circuit board 42 is in a plate shape and is rectangular or square as a whole.

In the embodiments of the present application, the circuit board 42 may be a printed circuit board (PCB), the PCB includes a driving circuit and an insulating layer, and the insulating layer exposes a bonding pad in the driving circuit for welding the light sources and covers remaining parts.

Or, the circuit board 42 may also be an array substrate formed by manufacturing a thin film transistor driving circuit on a base substrate, and a surface of the array substrate has electrodes connected to the thin film transistor driving circuit for welding the light sources.

A material of the circuit board 42 may be an aluminum substrate, BT or FR4, which is not limited here. Or, a base or base substrate of the circuit board 42 may adopt a hard material or adopt a flexible material to form a flexible display apparatus.

The circuit board 42 provides a driving electric signal for the light sources. The light sources 43 are welded on the circuit board 42 to electrically connect the light sources 43 with the driving circuit in the circuit board 42, and controlling the driving signal of the circuit board 42 may drive the light sources 43 to emit light.

The backlight module according to an embodiment of the present application is a direct backlight module, and the light sources 43 are distributed on the circuit board 42 to emit light rays to the upper side so as to provide backlight. The light sources 43 on the circuit board 42 are partitioned, light emitting brightness in each partition may be independently controlled, and therefore backlight brightness in each partition is regulated according to displayed images to achieve dynamic control over backlight so as to increase the contrast of the displayed images.

In the embodiments of the present application, the light sources 43 may adopt blue light emitting diodes to emit blue light, and a wavelength of light rays emitted from the blue light emitting diodes is 440 nm to 450 nm.

The wavelength conversion layer 44 is disposed on a light emitting side of the light sources 43, the wavelength conversion layer 44 is disposed as a whole layer with a shape being substantially same as the shape of the back plate 41, which may be square or rectangular usually.

The wavelength conversion layer 44 includes a red light conversion material and a green light conversion material, and under irradiation of the blue light, the red light conversion material is excited to emit red light (620 nm to 660 nm) and the green light conversion material is excited to emit green light (525 nm to 545 nm). Therefore, the wavelength conversion layer 44 is excited by the blue light to emit the red light and the green light, and the blue light, the red light and the green light are mixed to form white light so as to provide backlight for the display panel.

In the embodiments of the present application, the wavelength conversion layer 44 may be a quantum dot layer, the quantum dot layer includes a red quantum dot material and a green quantum dot material, the red quantum dot material is excited by the blue light to emit red light, the green quantum dot material is excited by the blue light to emit green light, and the red light and the green light which are emitted by excitation and the transmitted blue light are mixed to form white light to be emitted.

In other embodiments of the present application, the wavelength conversion layer 44 may be a fluorescent layer, the fluorescent layer includes a red light conversion material and a green light conversion material, the red light conversion material is excited by the blue light to emit red light, the green light conversion material is excited by the blue light to emit green light, and the red light and the green light which are emitted by excitation and the transmitted blue light are mixed to form white light to be emitted.

The reflective layer 45 is located on a side of the circuit board 42 close to the light sources 43. A shape of the reflective layer 45 is substantially same as that of the circuit board 42 and is usually a square or a rectangle. The reflective layer 45 includes a plurality of openings for exposing the light sources 43.

The reflective layer 45 is configured for scattering or diffuse reflection on incident light rays, light rays emitted from the light sources 43 to one side of the circuit board 42 or light rays reflected to one side of the circuit board 42 may be reflected again by the reflective layer 45 to the light emitting side of the backlight module, and thus use efficiency of the light sources 43 is improved.

When the light sources 43 are light emitting diodes, the reflective layer 45 may be disposed as a reflective sheet or as a white oil coating on the surface of the circuit board.

The first functional layer 46 is located between the light sources 43 and the wavelength conversion layer 44. The first functional layer 46 is disposed as a whole layer with a shape being substantially same as the shape of the wavelength conversion layer 44, which may be square or rectangular usually.

An angle of the light rays emitted from the light sources is related to an incident angle of the light rays entering the first functional layer, when small-angle light rays emitted from the light sources enter into the first functional layer, the incident angle is small, and when large-angle light rays emitted from the light sources enter into the first functional layer, the incident angle is large. In the embodiments of the present application, the first functional layer 46 is configured to reflect the small-angle light rays emitted from the light sources 43 and transmit the large-angle light rays emitted from the light sources 43. A reflectivity of the first functional layer 46 to the incident light rays is decreased with increasing of the angle of the incident light rays, that is, the larger the incident angle of the incident light rays, the smaller the reflectivity of the first functional layer to the incident light rays, and the larger a transmittance to the incident light rays; and the smaller the incident angle of the incident light rays, the larger the reflectivity of the first functional layer to the incident light rays, and the smaller the transmittance.

The first functional layer 46 in the present application may be the above angle selection layer.

Since the light sources 43 adopt the light emitting diodes (LED) and an emitting light pattern of the LEDs meets Lambertian distribution, energy of emitting light is concentrated in a small angle, and energy of the light rays is distributed less with increasing of the emitting angle of the light rays. Therefore, if the quantity of the light sources used in the backlight module is reduced, when the distance between the light sources is increased, brightness over the LEDs will be high, while brightness at junction areas of the adjacent LEDs will be low, resulting in the non-uniform backlight brightness.

In the embodiments of the present application, the first functional layer 46 is disposed on the light emitting side of the light sources 43, so that when the light rays emitted from the light sources 43 enter into the first functional layer 46, the reflectivity of the first functional layer 46 to the incident light rays is decreased with increasing of the angle of the incident light rays. In this way, when the large-angle light rays emitted from the light sources 43 enter the first functional layer 46, most of the light rays are transmitted by the first functional layer 46; while when the small-angle light rays emitted from the light sources 43 enter the first functional layer 46, most of the light rays are reflected by the first functional layer 46, and the reflected light rays are subjected to scattering or diffuse reflection after entering the reflective layer 45, so that large-angle light rays are generated again to be reflected to the first functional layer 46 so as to be transmitted by the first functional layer 46. By means of the above reflection for several times, the energy of the light rays emitted from the light sources 43 may be not concentrated in the small emitting angle any more, so that the light rays emitted from the light sources 43 are relatively uniform.

The reflectivity of the first functional layer 46 to the incident light rays is 10% to 90%. The reflectivity of the first functional layer 46 to the incident light rays may be lowered from 90% to 10% with increasing of the incident angle, that is, the smaller the angle of the light rays emitted from the light sources, the smaller the incident angle of the light rays entering the first functional layer, and the more obvious a reflecting effect of the first functional layer 46 to the light rays; and the larger the angle of the light rays emitted from the light sources, the larger the incident angle of the light rays entering the first functional layer, and the more obvious a transmitting effect of the first functional layer 46 to the light rays. After the reflected light rays are subjected to a circulating reflecting effect of the first functional layer 46 and the reflective layer 45, transmitting of the small-angle light rays will be decreased, transmitting of the large-angle light rays will be increased, and finally uniform light intensity is achieved.

Figure 26:
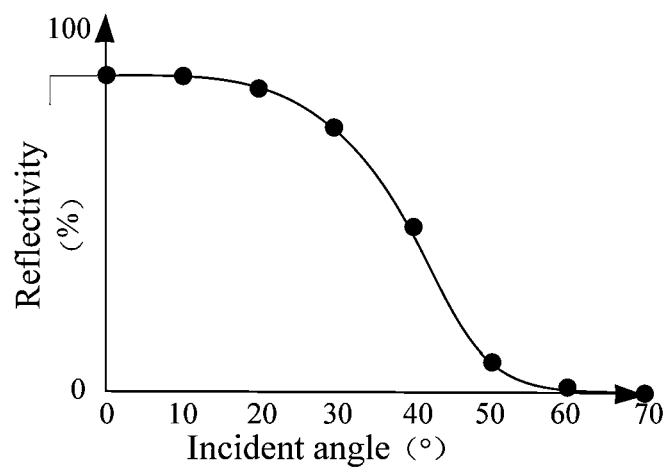
FIG. 26 is a graph of a reflectivity of a first functional layer according to an embodiment of the present application.

FIG. 26 is a graph of the reflectivity of the first functional layer according to an embodiment of the present application.

Referring to FIG. 26, when the light sources adopt blue light emitting diodes, a wavelength of light emitted from the blue light emitting diodes is 440 nm to 450 nm. According to the first functional layer, for blue light waves, the smaller the incident angle of the light rays, the larger the reflectivity of the first functional layer; and the larger the incident angle of the light rays, the smaller the reflectivity of the first functional layer. It can be seen from FIG. 26 that the reflectivity of the first functional layer 46 to blue light is decreased with increasing of the incident angle of the incident light rays, when the incident angle of the blue light is 0° to 30°, the reflectivity is large, when the incident angle is increased to 40°, the reflectivity is lowered slightly, and when the incident angle is increased to 50° to 70°, the reflectivity is greatly lowered.

Therefore, disposing the first functional layer 46 on the light emitting side of the blue light emitting diodes may uniformize the light emitted from the blue light emitting diodes.

The second functional layer 47 is located between the first functional layer 46 and the wavelength conversion layer 44. The second functional layer 47 is disposed as a whole layer with a shape substantially same as the shape of the wavelength conversion layer 44, which may be square or rectangular usually.

The second functional layer 47 is configured to transmit light emitted from the light sources 43 and reflect exciting light emitted from the wavelength conversion layer 44. The second functional layer 47 may transmit small-angle light, and meanwhile, reflect small-angle exciting light emitted from the wavelength conversion layer 44 to the light emitting side of the backlight module.

The second functional layer 47 in the present application may be the above transmittance-enhancement film layer.

Figure 27:
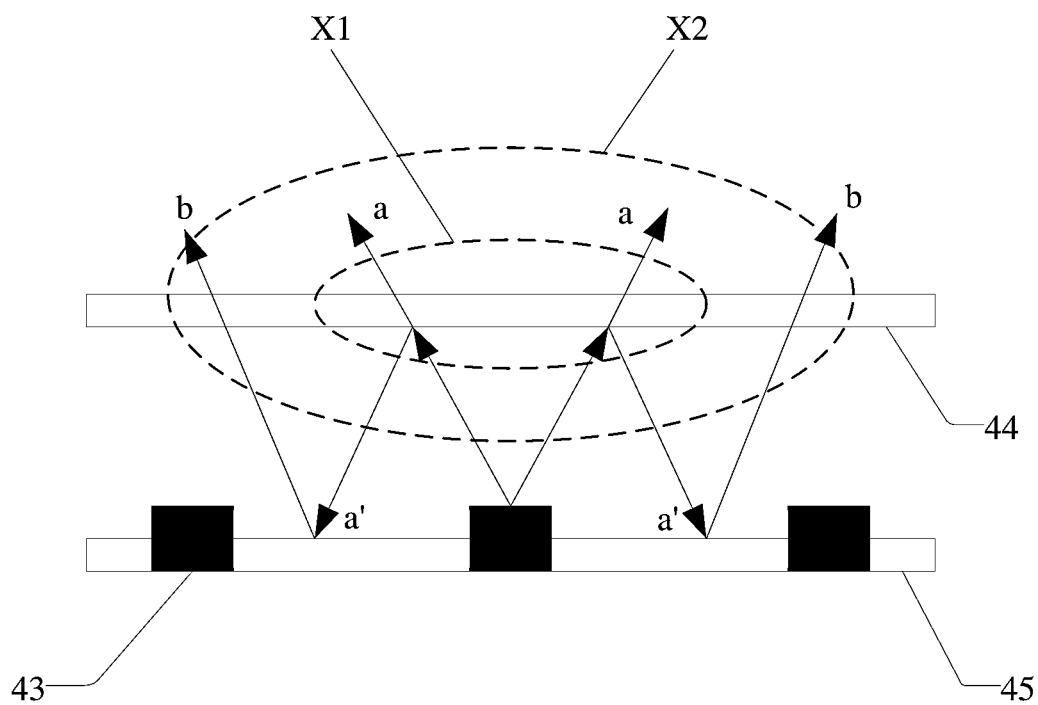
FIG. 27 is a schematic diagram of emergent light rays of a wavelength conversion layer.

FIG. 27 is a schematic diagram of emitting light rays of the wavelength conversion layer according to an embodiment of the present application.

Referring to FIG. 27, the light rays emitted from the wavelength conversion layer 44 by excitation are not only emitted to the light emitting side of the backlight module, but also emitted to a side of the circuit board wherein the light sources are located. In local dimming scenario, it is desired that small-angle light rays a emitted from the light sources 43 have a coverage range X1 after passing the wavelength conversion layer 44, so that the light rays emitted from the adjacent light sources cannot have crosstalk with each other. However, the light emitted by the wavelength conversion layer 44 by excitation is also emitted to one side of the light sources 43, so that the small-angle light rays a emitted from the light sources 43 excite a part of light rays a' in the light rays emitted from the wavelength conversion layer 44 to enter the reflective layer 45, and after reflection by the reflective layer 45, finally emitting light rays b have a coverage range X2. It can be seen from FIG. 26 that the coverage range of the light rays emitted from the light sources at present will cover a region wherein the adjacent light sources are located, which finally causes crosstalk of the light rays, negatively affecting local dimming.

Figure 28:
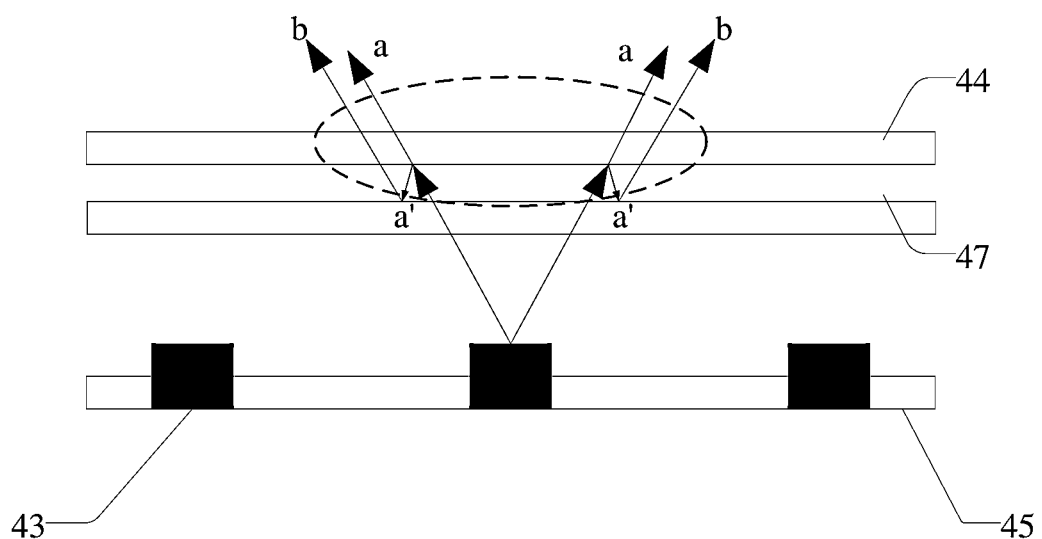
FIG. 28 is a diagram of a working principle of a second functional layer according to an embodiment of the present application.

FIG. 28 is a diagram of a work principle of the second functional layer according to an embodiment of the present application.

Referring to FIG. 28, the second functional layer 47 is disposed on a side of the wavelength conversion layer 44 facing the light sources 43 in the embodiment of the present application, and the second functional layer 47 is configured to transmit the small-angle light rays emitted from the light sources 43 and reflect the small-angle light rays excited by the wavelength conversion layer 44. In this way, the small-angle light rays a emitted from the light sources 43 may be transmitted by the second functional layer 47, after the small-angle light rays enter the wavelength conversion layer 44, small-angle light rays a' in the light rays excited by the wavelength conversion layer 44 are emitted to one side of the light sources, in this case, this part of light rays a' will enter the second functional layer 47 to be reflected by the second functional layer 47 towards the light emitting side of the backlight module (e.g., reflected light rays b), and thus the small-angle light rays emitted from the light sources 43 and the small-angle light rays excited by the wavelength conversion layer 44 both have good convergence, light cross-talk between partitions is avoided, and the display contrast is increased.

In the embodiments of the present application, the light sources 43 may use the blue light emitting diodes, the blue light emitting diodes emit blue light, while the wavelength conversion layer 44 emits red light and green light under excitation of the blue light.

Figure 29:
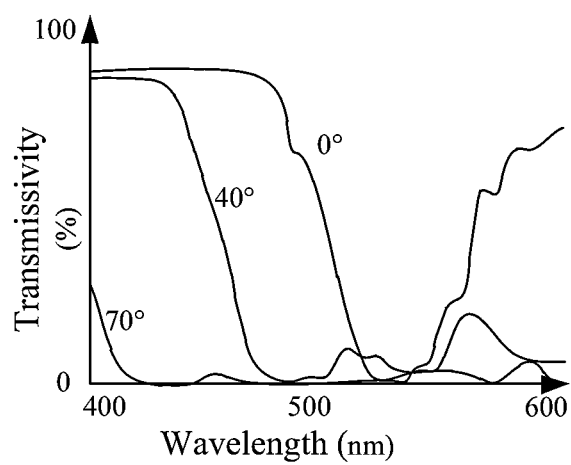
FIG. 29 is a transmittance graph of a second functional layer according to an embodiment of the present application.

FIG. 29 is a graph of the transmittance of the second functional layer according to an embodiment of the present application.

It can be seen from FIG. 29 that the second functional layer 47 in the embodiments of the present application has a high transmittance for small-angle incident blue light (440 nm to 450 nm), and the transmittance is lowered for large-angle incident blue light. As shown in FIG. 28, when the incident angle of the blue light is 0° or 40°, the transmittance of the second functional layer 47 to the incident blue light is high, and when the incident angle of the blue light is 70°, the transmittance of the second functional layer 47 to the incident blue light is lowered. The second functional layer 47 has a low transmittance for incident red light and green light.

Figure 30:
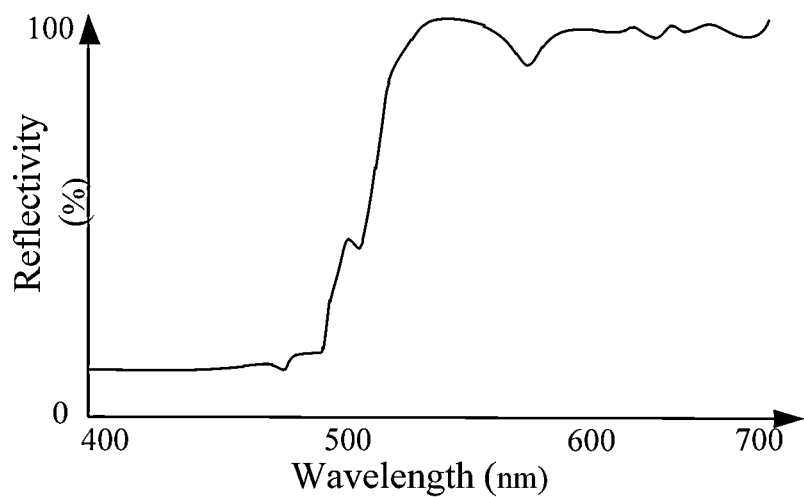
FIG. 30 is a reflectivity graph of a second functional layer according to an embodiment of the present application.

FIG. 30 is a graph of the reflectivity of the second functional layer according to an embodiment of the present application.

It can be seen from FIG. 30 that, in the embodiments of the present application, the second functional layer 47 has a low reflectivity to the blue light (440 nm to 450 nm) and has a high reflectivity to the red light (620 nm to 660 nm) and the green light (525 nm to 545 nm).

Figure 31:
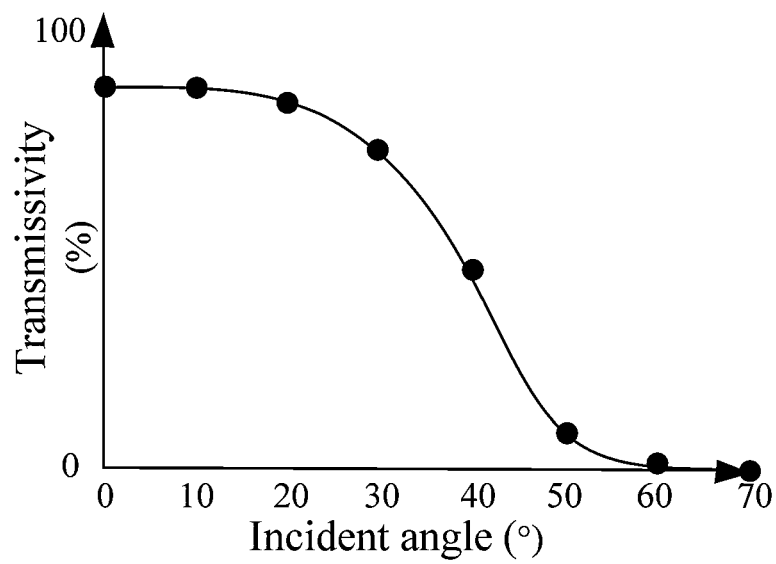
FIG. 31 is a transmittance graph of a second functional layer to blue light according to an embodiment of the present application.

FIG. 31 is a graph of the transmittance of the second functional layer to the blue light according to an embodiment of the present application.

It can be seen from FIG. 31 that the second functional layer 47 in the embodiments of the present application has a high transmittance for the small-angle incident blue light, and the transmittance of the second functional layer 47 to the blue light is lowered with increasing of the incident angle of the blue light. As shown in FIG. 31, when the incident angle of the blue light is 0° to 30°, the transmittance of the second functional layer 47 is high, and when the incident angle of the blue light is increased to 50° or more, the transmittance of the second functional layer 47 is nearly 0.

It can be seen that the second functional layer 47 in the embodiments of the present application may transmit the blue light and reflect the red light and the green light, the second functional layer 47 may transmit the small-angle blue light and reflect the small-angle red light and green light, and meanwhile, the transmittance of the second functional layer 47 to the blue light is decreased with increasing of the incident angle.

In the embodiments of the present application, the first functional layer 46 is configured to reflect the small-angle light rays emitted from the light sources, and the second functional layer 47 is configured to transmit the small-angle light rays transmitted from the light sources. Therefore, when the two functional layers are disposed adjacently, the effect of the functional layers cannot be achieved, and the technical effects required by the present application cannot be achieved.

Therefore, as shown in FIG. 25, the diffusion layer 48 is disposed between the first functional layer 46 and the second functional layer 47 in the embodiments of the present application.

The diffusion layer 48 is disposed as a whole layer with a shape being substantially same as that of the first functional layer 46 and the second functional layer 47. Usually, the shape may be a rectangle or a square.

The diffusion layer 48 is configured to scatter the incident light rays, scattering particle materials are disposed in the diffusion layer 48, and the light rays will be refracted and reflected continuously after entering the scattering particle materials, so that the effect of dispersing the light rays is realized to achieve light uniformizing.

Disposing the diffusion layer 48 between the first functional layer 46 and the second functional layer 47 may make the two functional layers be collectively used in the backlight module, and the light rays emitted from the light sources pass the first functional layer 46, thereby having high uniformity; and after the light rays emitted from the first functional layer 46 pass the diffusion layer 48, the angle of the light rays entering the second functional layer 47 is random, so that emitting light with good convergence may be obtained after the light rays pass the second functional layer 47. Therefore, an ultra-thin direct backlight module structure may be achieved, which solves the problem of non-uniform light emitting caused by a large distance between the light sources and improves the convergence of the emitting light rays at the same time.

The optical film 49 is located on a side of the wavelength conversion layer 44 away from the second functional layer 47. The optical film 49 is disposed as a whole layer, and a shape of the optical film 49 is substantially same as that of the wavelength conversion layer 44 and usually may be a rectangle or a square.

Disposing the optical film 49 may make the backlight module adaptive to various practical applications.

The optical film 49 may include a prism sheet, and the prism sheet may change an emitting angle of light rays to change a viewing angle of the display apparatus. The prism sheet usually has the effect of converging light rays to a front view angle direction, thereby increasing front view angle brightness.

The optical film 49 may further include a reflective polarizer. As a brightness enhancement sheet, the reflective polarizer may increase the brightness of the backlight module, improve use efficiency of light rays, and make emitting light rays have a polarizing property, so a polarizer may be omitted in the liquid crystal panel.

Figure 32:
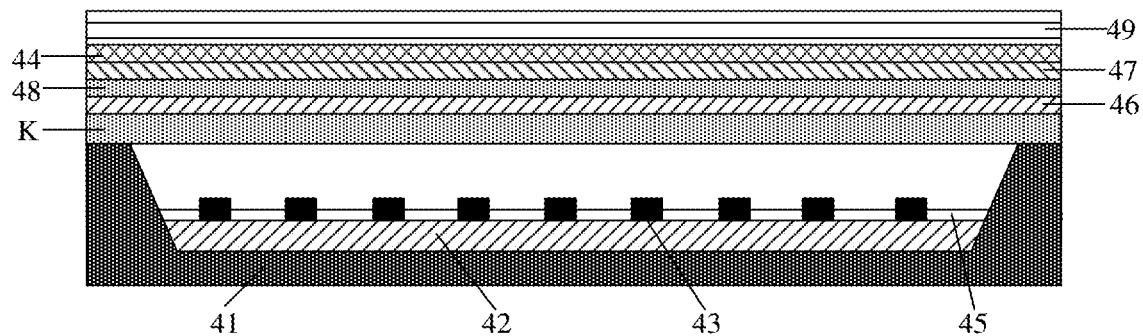
FIG. 32 is a schematic cross-sectional view of a backlight module according to some embodiments of the present application.

FIG. 32 is a second schematic cross-sectional view of the backlight module according to an embodiment of the present application.

Referring to FIG. 32, the backlight module in the embodiments of the present application further includes: a diffusion plate K located between the light sources 43 and the first functional layer 46.

A shape of the diffusion plate K is substantially same as that of the first functional layer 46 and usually may be a rectangle or a square. A thickness of the diffusion plate K is 1.5 mm to 3 mm. The diffusion plate K and the light sources 43 have a certain distance, and thus the light rays emitted from all the light sources 43 may be mixed to make the emitting light rays more uniform.

The diffusion plate K has large haze, and usually may be processed through an extrusion process. A material of the diffusion plate K is generally selected from at least one of polymethyl methacrylate (PMMA), polycarbonate (PC), polystyrene (PS) or polypropylene (PP).

When the diffusion plate K is adopted in the backlight module, the thickness of the diffusion layer 48 between the first functional layer 46 and the second functional layer 47 is relatively small. The diffusion layer 48 is usually formed by coating a base material with diffusion particles, the base material may use polyethylene terephthalate (PET) or glass, and the diffusion particles may adopt titanium dioxide, zinc oxide, calcium oxide and the like.

In other embodiments of the present application, as shown in FIG. 25, the diffusion layer 48 between the first functional layer 46 and the second functional layer 47 may adopt the diffusion plate, so that the first functional layer 46 may be attached to a surface of a side of the diffusion plate facing the light sources, and the second functional layer 47 may be attached to a surface of a side of the diffusion plate away from the light sources.

By adopting the structure of the backlight module as shown in FIG. 25, one diffusion layer may be omitted, so that the structure of the backlight module is more compact, and mounting complexity is lowered.

Figure 33:
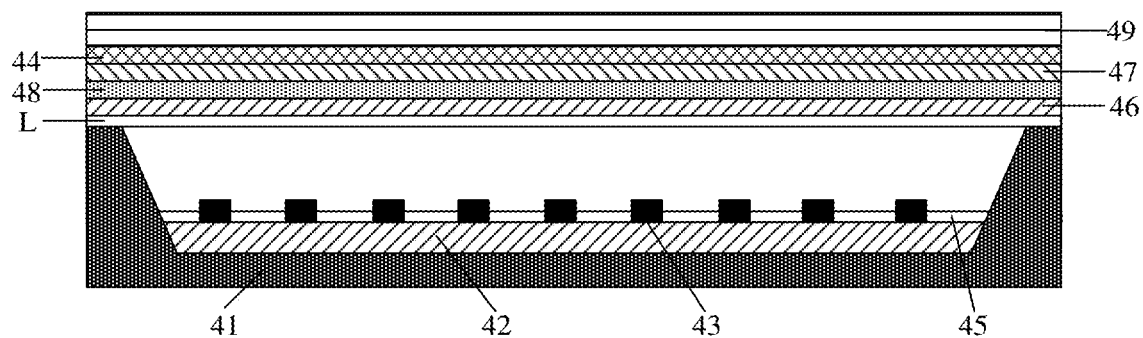
FIG. 33 is a schematic cross-sectional view of a backlight module according to some embodiments of the present application.

FIG. 33 is a third schematic cross-sectional view of the backlight module according to an embodiment of the present application.

Referring to FIG. 33, the backlight module in other embodiments of the present application further includes: a transparent substrate L.

The transparent substrate L is located between the light sources 43 and the first functional layer 46. A shape of the transparent substrate L is substantially same as that of the first functional layer 46 and usually may be a rectangle or a square. The transparent substrate L may be made of PMMA or glass.

The first functional layer 46 is disposed on a surface of a side of the transparent substrate L away from the back plate 41, so that the transparent substrate L supports the first functional layer 46. The diffusion layer 48 may use diffusion plate, and by adopting the above structure, the first functional layer may be prevented from being attached to the diffusion layer 48, thereby lowering processing complexity.

In the embodiments of the present application, the first functional layer 46 and the second functional layer 47 are both disposed by utilizing the principle of film interference. During specific implementation, the first functional layer 46 and the second functional layer 47 each include a plurality of film layers disposed in a laminated mode, and every two adjacent film layers have different refraction indexes. The refraction indexes and thicknesses of the film layers meet a condition of film interference.

Figure 34:
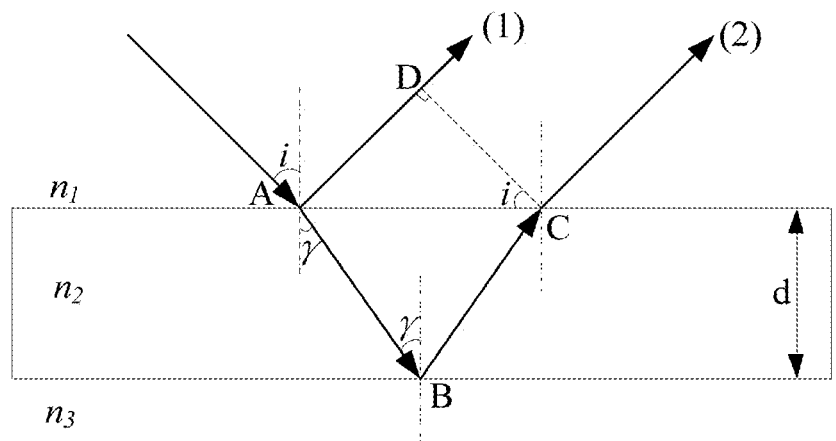
FIG. 34 is a schematic diagram of film interference according to some embodiments of the present application.

FIG. 34 is a schematic diagram of film interference according to an embodiment of the present application.

Referring to FIG. 33, when light rays enter a surface of a thin film with a refraction index being $n_2$ from a medium with a refraction index being $n_1$ with an incident angle of i, light reflection and refraction occur at an interface of two media with refraction index $n_1$ and refraction index $n_2$, a reflection angle and the incident angle are equal and are still i, and a refraction angle is γ; and when refracted light rays enter a lower surface of the thin film, light reflection and refraction also occur on the lower surface, wherein reflected light rays will pass an upper surface of the thin film to be refracted in the medium $n_1$, and thus two beams of reflected light rays (1) and (2) are formed on the upper surface and the lower surface of the thin film. An optical path difference δ' between the reflected light ray (1) and the reflected light ray (2) is:

$$\delta' = n_2(\overline{AB}+\overline{BC}) - n_1\overline{AD}.$$

If a thickness of the thin film with the refraction index being $n_2$ is d and the thickness of the thin film is uniform, due to $\overline{AB}=\overline{BC}=d/\cos\gamma$ and $\overline{AD}=\overline{AC}\sin i = 2d\tan\gamma \times \sin i$, the following may be obtained:

$$\delta' = n_2 2\overline{AB} - n_1\overline{AD} = \frac{2n_2 d}{\cos\gamma} - 2n_1 d\tan\gamma \times \sin i = \frac{2d}{\cos\gamma}(n_2 - n_1\sin i \sin\gamma).$$

It can be known from the refraction law that:

$$n_1 \sin i = n_2 \sin\gamma;$$

so:

$$\delta' = \frac{2dn_2}{\cos\gamma}(1 - \sin^2\gamma) =$$
$$\frac{2n_2 d}{\cos\gamma}\cos^2\gamma = 2n_2 d\cos\gamma = 2n_2 d\sqrt{1-\sin^2\gamma} = 2d\sqrt{n_2^2 - n_1^2\sin^2 i}.$$

It can be seen from the above formula that, if a multi-layer film structure is disposed, an optical path difference between reflected light of the light rays on the upper and lower surfaces of each layer of medium is only related to a refraction index and a thickness of this layer and an incident angle. In practical applications, light rays usually enter a thin film from an air medium, light reflection occurs on an upper surface and a lower surface of the thin film, that is, the refraction index in the above formula is $n_1 = 1$, and thus the above formula may be simplified as:

$$\delta' = 2d\sqrt{n_2^2 - n_1^2\sin^2 i} = 2d\sqrt{n_2^2 - \sin^2 i}.$$

It can be known from the thin-film interference principle that, when the optical path difference between the reflected light rays on the upper surface and the lower surface of the thin film is integer times of a wavelength, the two beams of light rays are coherently added; and when the optical path difference between the reflected light rays on the upper surface and the lower surface is odd times of a half-wavelength, the two beams of light rays are coherently subtracted. According to the principle of energy conservation, if the reflected light is coherently added, energy of the reflected light is enhanced, and energy of transmittance light is weakened; and if the reflected light is coherently subtracted, the energy of the reflected light is weakened, and the energy of the transmittance light is enhanced.

When the above principle is applied to the embodiments of the present application, for any film layer in the first functional layer 46 and the second functional layer 47, an incident angle of reflection enhancement is set as $\theta_1$ and an incident angle of anti-reflection is set as $\theta_2$, and by utilizing the above principle, a proper film layer material may be selected, so that the refraction index and the thickness of the film layer meet reflection enhancement for light rays with the incident angle $\theta_1$ and transmittance enhancement for light rays with the incident angle $\theta_2$.

What is claimed is:

1. A display apparatus, comprising:
   a display panel, configured to display an image;
   a micro light emitting diode light board, used as a backlight source; wherein the panel is on a light emitting side of the micro light emitting diode light board; the micro light emitting diode light board comprises a circuit board, a plurality of micro light emitting diodes and a reflective layer; the circuit board is configured to provide a driving signal; the plurality of micro light emitting diodes is on the circuit board; and the reflective layer is on a surface of a side of the circuit board close to the micro light emitting diodes, the reflective layer comprises an opening for exposing one of the plurality of the micro light emitting diodes, and the reflective layer is configured to perform diffuse reflection on incident light rays;
   an angle selection layer on the light emitting side of the micro light emitting diode light board, configured to reflect light rays with a first incident angle range and transmit light rays with a second incident angle range; wherein an incident angle value corresponding to the first incident angle range is smaller than an incident angle value corresponding to the second incident angle range; and the reflective layer and the angle selection layer are used for improving light emitting uniformity of the micro light emitting diode light board; and
   a diffusion layer on a side of the angle selection layer away from the micro light emitting diode light board, or, between the angle selection layer and the micro light emitting diode light board;
   wherein a reflectivity of the angle selection layer to the light rays with the first incident angle range is decreased with increase of an incident angle; and
   the reflectivity of the angle selection layer to the light rays with the first incident angle range is 10% to 80%, and the reflectivity of the angle selection layer to the light rays with the second incident angle range is less than 10%.

2. The display apparatus according to claim 1, wherein a vertical distance from the circuit board to the diffusion layer and a distance between every two adjacent micro light emitting diodes meet a following relationship:

$$0.15 \leq h/p < 0.67;$$

wherein h represents the vertical distance from the circuit board to the diffusion layer, and p represents a distance between every two adjacent micro light emitting diodes.

3. The display apparatus according to claim 1, wherein the angle selection layer further comprises:
   a plurality of film layers, disposed in a laminated mode, wherein every two adjacent film layers of the plurality of film layers have different refraction indexes;
   wherein the refraction indexes and thicknesses of the plurality of film layers meet a condition of reflecting the light rays with the first incident angle range and transmitting the light rays with the second incident angle range.

4. The display apparatus according to claim 1, wherein the first incident angle range is 0° to 70°, and the second incident angle range is greater than 70°.

5. The display apparatus according to claim 1, wherein the micro light emitting diode light board further comprises:
   a packaging layer on a surface of a side of the micro light emitting diode away from the circuit board.

6. The display apparatus according to claim 1, further comprising:
   the angle selection layer is attached to a surface of the diffusion layer.

7. The display apparatus according to claim 6, further comprising:
   a transparent substrate between the micro light emitting diode light board and the diffusion layer; wherein
   the angle selection layer is attached to a surface of a side of the transparent substrate away from the micro light emitting diode light board.

8. The display apparatus according to claim 6, further comprising:
   a transparent support on the micro light emitting diode light board, configured to support the diffusion layer.

9. The display apparatus according to claim 3, further comprising:
   a base, wherein the plurality of film layers are disposed on the base.

* * * * *